United States Patent
Wu et al.

(10) Patent No.: US 12,492,215 B2
(45) Date of Patent: Dec. 9, 2025

(54) PYRROLOTRIAZINE COMPOUNDS ACTING AS MNK INHIBITOR

(71) Applicant: JUMBO DRUG BANK CO., LTD., Sichuan (CN)

(72) Inventors: Lingyun Wu, Shanghai (CN); Xiawei Wei, Sichuan (CN); Peng Yang, Shanghai (CN); Lele Zhao, Shanghai (CN); Chen Zhang, Shanghai (CN); Ning Jiang, Sichuan (CN); Wei Zheng, Sichuan (CN); Jian Li, Shanghai (CN); Shuhui Chen, Shanghai (CN)

(73) Assignee: JUMBO DRUG BANK CO., LTD., Sichuan (CN)

( * ) Notice: Subject to any disclaimer, the term of this patent is extended or adjusted under 35 U.S.C. 154(b) by 739 days.

(21) Appl. No.: 17/664,026

(22) Filed: May 18, 2022

(65) Prior Publication Data
US 2022/0281895 A1     Sep. 8, 2022

Related U.S. Application Data

(63) Continuation-in-part of application No. PCT/CN2020/129603, filed on Nov. 18, 2020.

(30) Foreign Application Priority Data

Nov. 18, 2019  (CN) .......................... 201911129114.5
Apr. 24, 2020  (CN) .......................... 202010329964.6

(51) Int. Cl.
*C07D 519/00*     (2006.01)
*A61P 35/00*      (2006.01)

(52) U.S. Cl.
CPC ............ *C07D 519/00* (2013.01); *A61P 35/00* (2018.01)

(58) Field of Classification Search
None
See application file for complete search history.

(56) References Cited

U.S. PATENT DOCUMENTS

2024/0254144 A1*  8/2024  Wu ...................... C07D 519/00

FOREIGN PATENT DOCUMENTS

| CN | 106795162 A   |  5/2017 |
|----|---------------|---------|
| WO | 2015200481 A1 | 12/2015 |
| WO | 2016172010 A1 | 10/2016 |
| WO | 2017075394 A1 |  5/2017 |
| WO | 2017075412 A1 |  5/2017 |
| WO | 2017087808 A1 |  5/2017 |
| WO | 2017117052 A1 |  7/2017 |
| WO | 2018152117 A1 |  8/2018 |
| WO | 2018218038 A1 | 11/2018 |

OTHER PUBLICATIONS

Reich et al., Journal of Medicinal Chemistry 2018 61 (8), 3516-3540 (Year: 2018).*
Reich, Siegfried H. et al., "Structure-based Design of Pyridone-Aminal eFT508 Targeting Dysregulated Translation by Selective Mitogen-activated Protein Kinase Interacting Kinases 1 and 2 (MNK1/2) Inhibition", Journal of Medicinal Chemistry, vol. 61, Mar. 10, 2018, pp. 3516-3540.

* cited by examiner

*Primary Examiner* — Jeffrey S Lundgren
*Assistant Examiner* — Anthony Joseph Seitz
(74) *Attorney, Agent, or Firm* — NKL Law; Allen Xue

(57) ABSTRACT

Disclosed are pyrrolotriazine compounds which act as a mitogen-activated protein kinase interacting kinase (MNK) inhibitor, and the use thereof in the preparation of a mitogen-activated protein kinase interacting kinase inhibitor drug. Specifically disclosed are compounds represented by formula (I) or a pharmaceutically acceptable salt thereof.

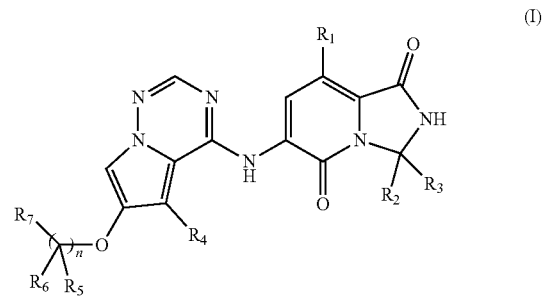

20 Claims, No Drawings

PYRROLOTRIAZINE COMPOUNDS ACTING AS MNK INHIBITOR

CROSS-REFERENCE TO RELATED APPLICATIONS

This application is a continuation-in-part application of PCT International Application No. PCT/CN2020/129603, filed on Nov. 18, 2020, which claims priority to Chinese Patent Application No. 201911129114.5, filed on Nov. 18, 2019, and Chinese Patent Application No. 202010329964.6, filed on Apr. 24, 2020, the contents of which are incorporated herein by reference in their entireties.

TECHNICAL FIELD

The present disclosure relates to pyrrolotriazine compounds as MAP kinase interacting kinase (MNK) inhibitors and pharmaceutical compositions thereof, and use thereof in preparing medicaments as MNK inhibitors. Specifically, the present disclosure relates to a compound of formula (I) or a pharmaceutically acceptable salt thereof.

BACKGROUND

Mitogen-activated protein kinase interacting kinase (MAP kinase interacting kinase, or MNK for short) is a serine/threonine protein kinase. There are four subtypes for human MNK, namely MNK1a and MNK1b expressed by MNK1 gene, and MNK2a and MNK2b expressed by MNK2 gene, respectively. All the 4 subtypes contain a nuclear localization signal (NLS) sequence and a sequence for binding to eIF4G at the N-terminal, and are thus capable of entering into a cell nucleus to play a role, and recognizing and binding to downstream eIF4E. The subtypes MNK1a and MNK2a have a binding site for MAPK at the C-terminal, and can be activated by upstream ERK and p38 phosphorylation. The nuclear export signal (NES) sequence at C-terminal of MNK1a makes it widely present in the cytoplasm, whereas the other 3 subtypes are mostly present in the nucleus.

Eukaryotic initiation factor 4E (eIF4E) is a cap-binding protein, and it can specifically recognize the cap structure at the 5' end of mRNA and is an important initiation factor in protein translation. S209-phosphorylated eIF4E can promote the translation of downstream proteins, mainly including c-MYC, cyclin D1, VEGF, FGF, and anti-apoptosis proteins such as mcl-1 and Bcl-2. The expression of eIF4E is up-regulated in lung cancer, colorectal cancer, gastric cancer, pancreatic duct carcinoma and other malignant tumors. MNK is the only kinase known to be able to phosphorylate eIF4E. In addition, MNK is located at an intersection of multiple signaling pathways involved in tumors and immune, such as RAS and T cell receptor (TCR), and can selectively control transcription of regulators of anti-tumor immune responses. MNK activity and activation of eIF4E are critical for tumor development and progression, but are not necessarily for normal cells. Therefore, a selective MNK inhibitor is expected to become an anti-tumor drug with low toxicity. EFT508 (WO2015/200481; WO2016/172010; WO2017/075394; WO2017/075412; WO2017/087808; WO2017/117052; WO2018/152117; WO2018/218038) is a selective oral MNK inhibitor being developed by EFFECTOR THERAPEUTICS INC. Research has shown that the eFT508 can selectively inhibit the expression of PD-1, LAG3 and IL-10, and improve the function of cytotoxic T cells without affecting the proliferation of normal T cells. Pre-clinical studies have found that the combination of eFT508 and PD-1 monoclonal antibody can enhance efficacy and increase response rate. The phase I clinical trial of the drug has been completed, and it showed good safety; currently, the monotherapy for hematological tumors and trending prostate cancer are in phase II clinical trial, the combined therapy with avelumab monoclonal antibody for microsatellite stable colorectal cancer (MSS CRC) is in phase II clinical trial, and the combined therapy with PD-1/PD-L1 therapy (for patients who are treated with PD-1/PD-L1 therapy alone before and have had disease progression or no complete or partial alleviation) for solid tumors is in phase II clinical trial.

SUMMARY

In one aspect, the present disclosure provides a compound of formula (I) or a pharmaceutically acceptable salt thereof,

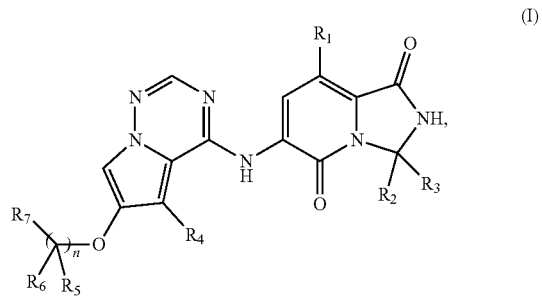

wherein: $R_1$ is H, F, Cl, Br or $C_{1-3}$ alkyl;

$R_2$ and $R_3$ are each independently H or $C_{1-3}$ alkyl, wherein the $C_{1-3}$ alkyl is optionally substituted with 1, 2 or 3 substituents independently selected from F, Cl, Br and I;

or $R_2$ and $R_3$, together with the carbon atom attached thereto, form cyclopentyl, cyclohexyl or piperidinyl, wherein the cyclopentyl, cyclohexyl and piperidinyl are optionally substituted with 1, 2 or 3 $R_a$;

each $R_a$ is independently H, F, Cl, Br or $C_{1-3}$ alkyl;

$R_4$ is H, F, Cl, Br or $C_{1-3}$ alkyl;

$R_5$ and $R_6$ are each independently H, F, Cl, Br, I or $C_{1-3}$ alkyl;

$R_7$ is pyrrolidinyl, wherein the pyrrolidinyl is optionally substituted with 1, 2 or 3 $R_b$;

each $R_b$ is independently H, F, Cl, Br, I or $C_{1-3}$ alkyl, wherein the $C_{1-3}$ alkyl is optionally substituted with 1, 2 or 3 substituents independently selected from F, Cl, Br and I;

n is 1 or 2.

In some embodiments of the present disclosure, each $R_a$ described above is independently H, F, Cl, Br, —$CH_3$ or —$CH_2CH_3$, and the other variables are as defined herein.

In some embodiments of the present disclosure, $R_2$ and $R_3$ described above are each independently H, —$CH_3$ or —$CH_2CH_3$, and the other variables are as defined herein.

In some embodiments of the present disclosure, $R_2$ and $R_3$ described above, together with the carbon atom attached thereto, form

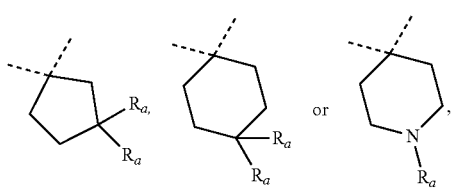

and $R_a$ and the other variables are as defined herein.

In some embodiments of the present disclosure, $R_2$ and $R_3$ described above, together with the carbon atom attached thereto, form

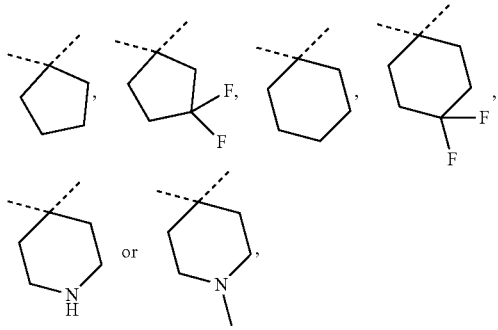

and the other variables are as defined herein.

In some embodiments of the present disclosure, the structural unit

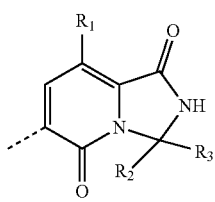

described above is

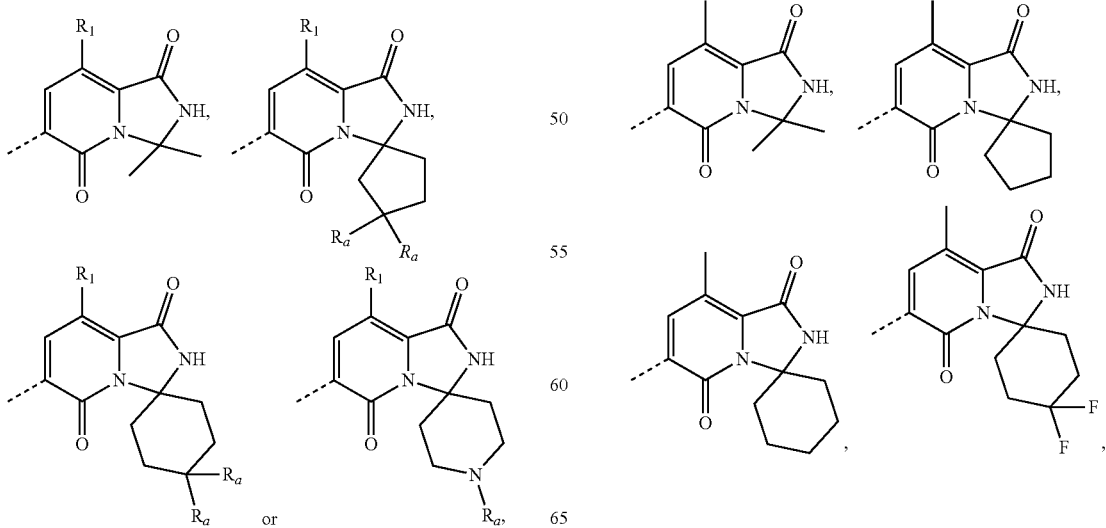

and $R_1$, $R_a$ and the other variables are as defined herein.

In some embodiments of the present disclosure, the structural unit

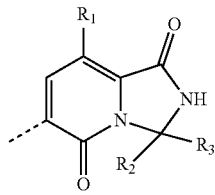

described above is

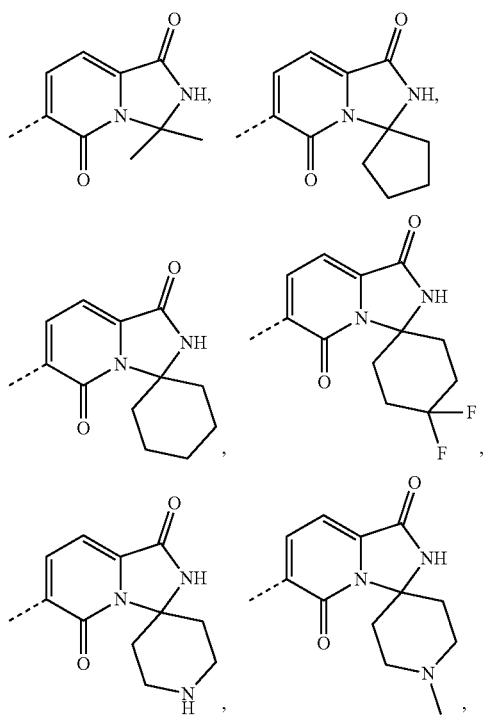

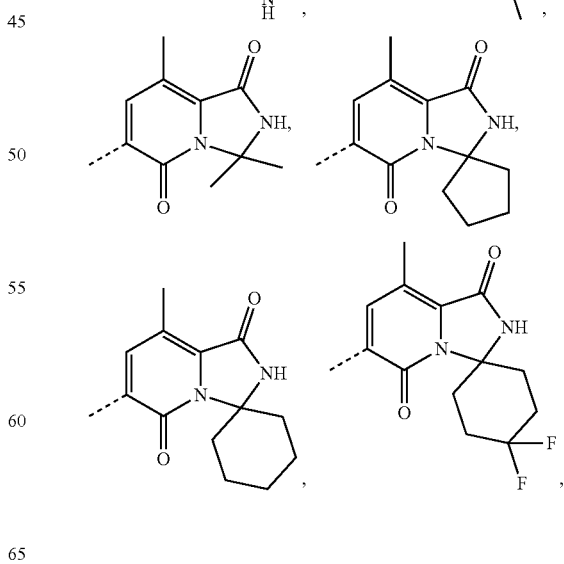

-continued

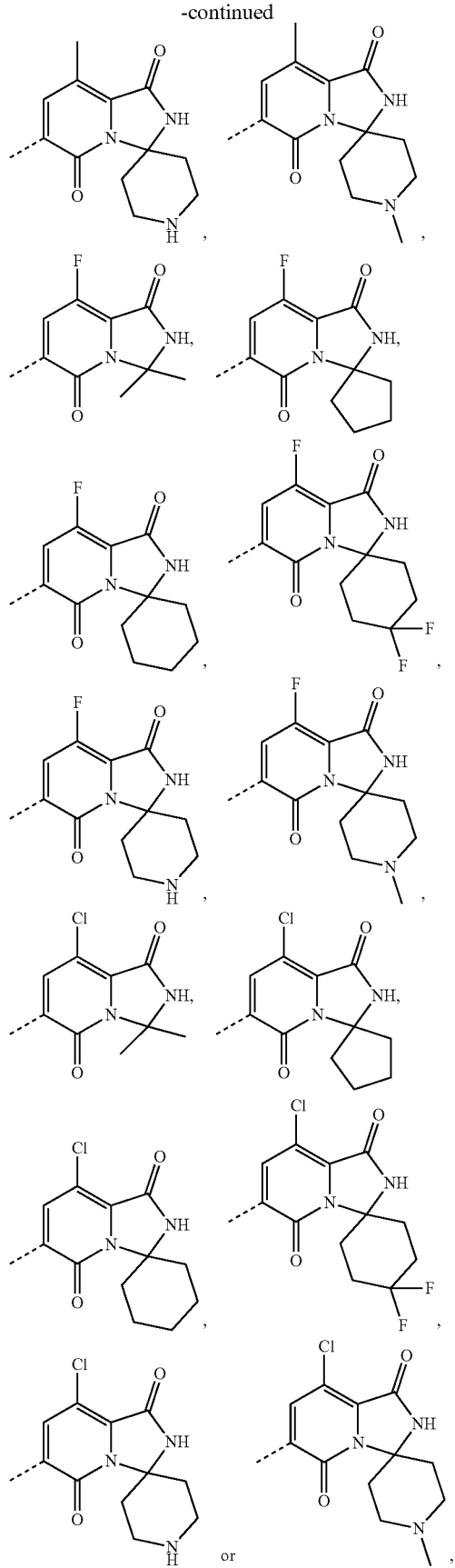

and the other variables are as defined herein.

In some embodiments of the present disclosure, the compound described above has a structure shown as any one of structural formulas (I-1) to (I-4):

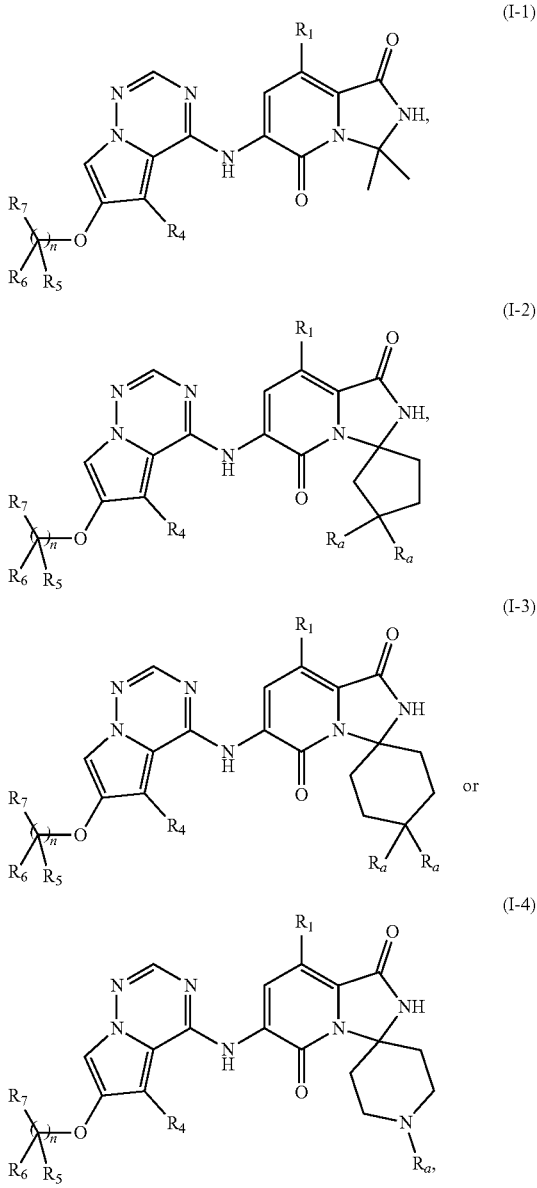

wherein $R_1$, $R_4$, $R_5$, $R_6$, $R_7$, $R_a$ and n are as defined herein.

In some embodiments of the present disclosure, each $R_b$ described above is independently H, F, Cl, Br, I,

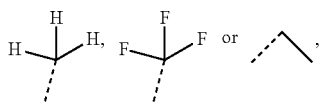

and the other variables are as defined herein.

In some embodiments of the present disclosure, $R_7$ described above is

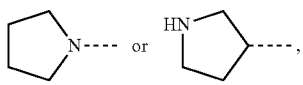

wherein the

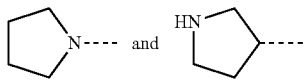

and are optionally substituted with 1 or 2 $R_b$, and $R_b$ and the other variables are as defined herein.

In some embodiments of the present disclosure, $R_7$ described above is

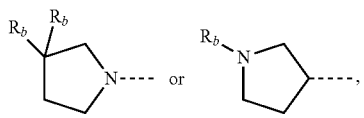

and $R_b$ and the other variables are as defined herein.

In some embodiments of the present disclosure, $R_7$ described above is

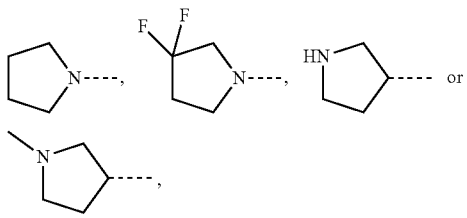

and the other variables are as defined herein.

In some embodiments of the present disclosure, $R_4$ is H or —$CH_3$, and the other variables are as defined herein.

In some embodiments of the present disclosure, the compound described above has a structure shown as any one of structural formulas (I-5) to (I-9):

(I-5)
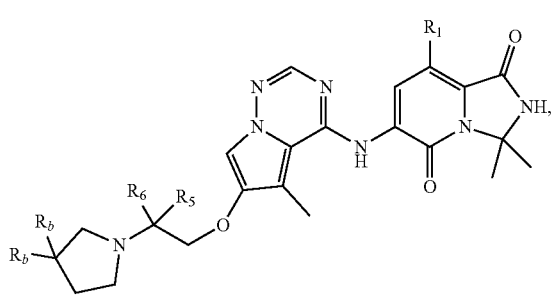

(I-6)
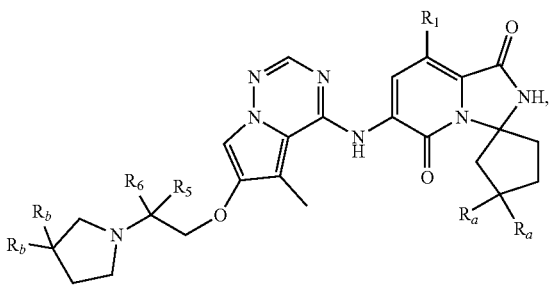

(I-7)
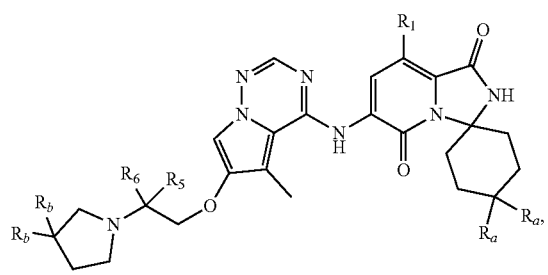

(I-8)
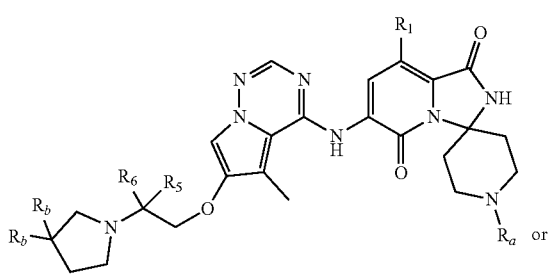

(I-9)
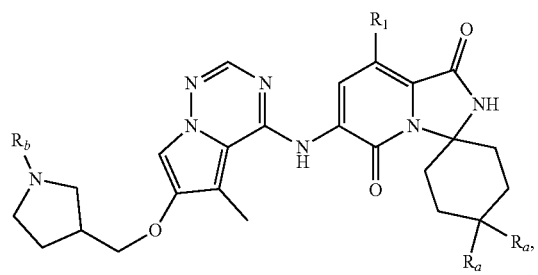

wherein $R_1$, $R_5$, $R_6$, $R_a$ and $R_b$ are as defined herein.

In some embodiments of the present disclosure, $R_1$ described above is H, F, Cl or

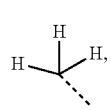

and the other variables are as defined herein.

In some embodiments of the present disclosure, $R_5$ and $R_6$ described above are each independently H or

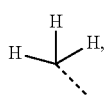
and the other variables are as defined herein.
Still some other embodiments of the present disclosure are derived from any combination of the variables described above.
In some embodiments of the present disclosure, the compound described above is a compound of a formula below:
1
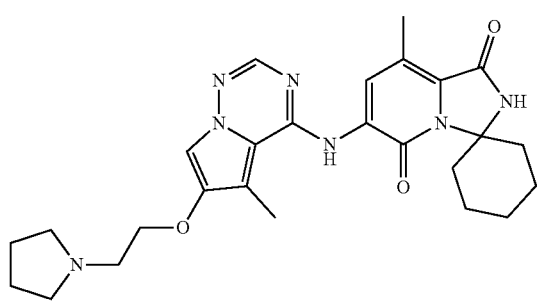
2
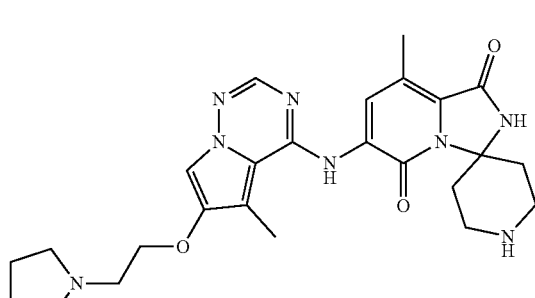
3
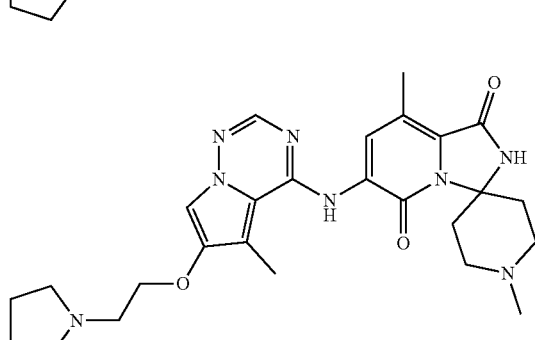
4
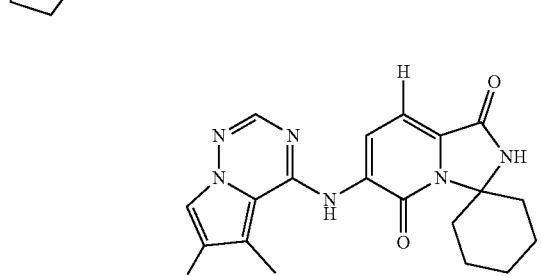
5
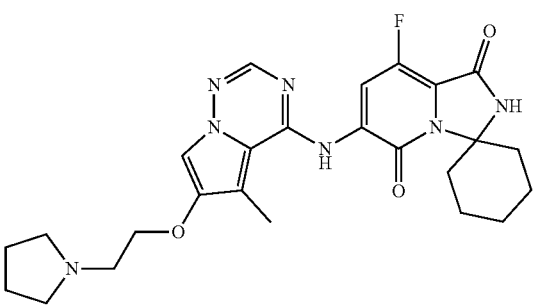
6
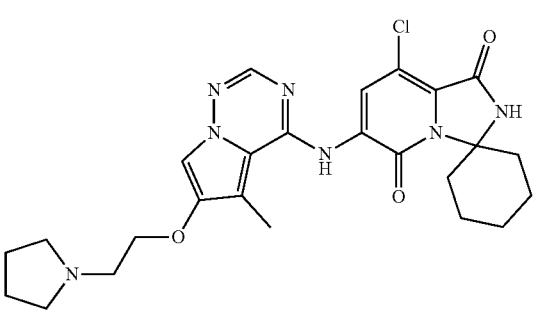
7
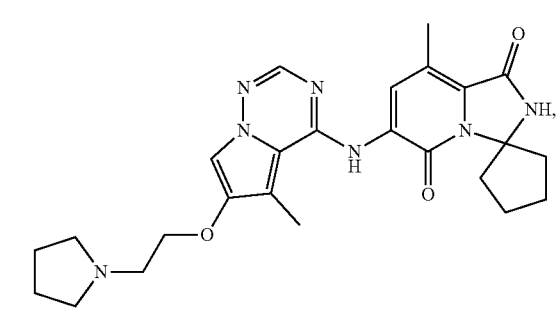
8
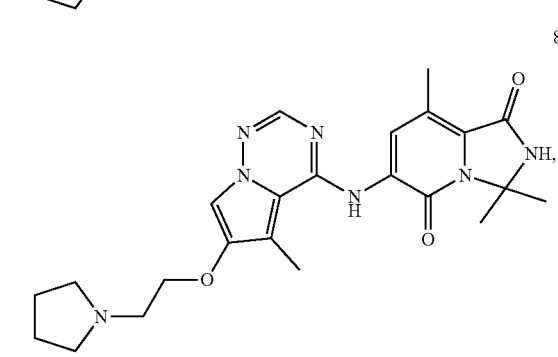
9
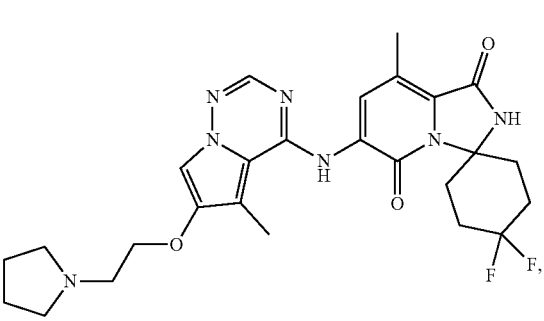

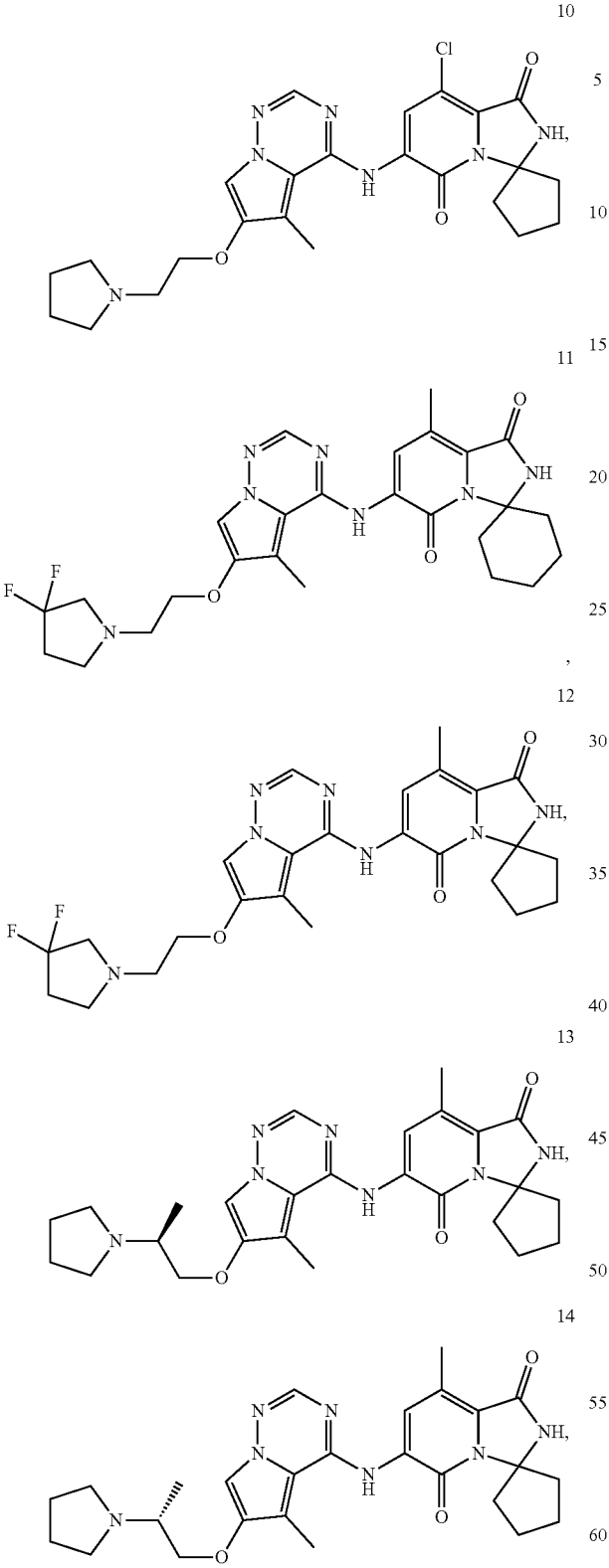

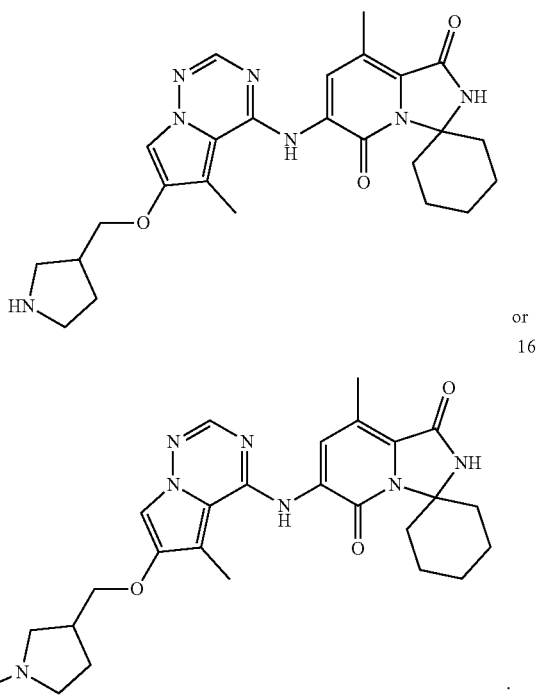

In some embodiments of the present disclosure, the pharmaceutically acceptable salt described above is a hydrochloride or a trifluoroacetate.

The present disclosure also provides use of the compound and the pharmaceutically acceptable salt thereof described above for manufacturing a medicament as an MNK1/2 inhibitor.

The present disclosure also provides use of the compound and the pharmaceutically acceptable salt thereof described above for manufacturing a medicament for the treatment of colorectal cancer.

The present disclosure also provides a method for inhibiting the activity of MNK1/2 in a cell overexpressing MNK1/2 comprising contacting the cell with a compound or a pharmaceutically acceptable salt thereof described herein.

In some embodiments of the present disclosure, the cell overexpressing MNK1/2 is a solid tumor cell, for example, a lung cancer cell, in particular a non-small cell lung cancer (NSCLC) cell, a colorectal cancer cell, a colon cancer cell, a rectal cancer cell, a gastric cancer cell, a pancreatic duct carcinoma cell, a colon cancer cell, a thyroid cancer cell, a hairy cell lymphoma cell, Hodgkin's lymphoma cell, non-Hodgkin's lymphoma cell, Burkitt's lymphoma cell, a pancreatic cancer cell, a melanoma cell, a multiple melanoma cell, a brain cancer cell, a CNS cancer cell, a renal cancer cell, a prostate cancer cell, an ovarian cancer cell, a bladder cancer cell, an esophageal cancer cell, a head and neck cancer cell, or a breast cancer cell, a glioblastoma cell, a hepatocellular cancer cell, a cervical cancer cell, a urothelial cancer cell, and/or other malignant tumor cell.

The present disclosure also provides a method for treating or preventing or MNK1/2 dependent disease in a subject in need thereof comprising administering the subject a therapeutically effective amount of at least one compound of formula (I) or a pharmaceutically acceptable salt thereof disclosed herein.

In some embodiments of the present disclosure, the MNK1/2 dependent disease is selected from the group consisting of a solid tumor or cancer, for example, lung cancer, in particular non-small cell lung cancer (NSCLC), colorectal cancer, colon cancer, rectal cancer, gastric cancer, pancreatic duct carcinoma, colon cancer, thyroid cancer, hairy cell lymphoma, Hodgkin's lymphoma, non-Hodgkin's lymphoma, Burkitt's lymphoma, pancreatic cancer, melanoma, multiple melanoma, brain cancer, CNS cancer, renal cancer, prostate cancer, ovarian cancer, bladder cancer, esophageal cancer, head and neck cancer, or breast cancer, glioblastoma, myelodysplasia syndrome, malignant glioma, hepatocellular cancer, hepatocellular carcinoma, cervical cancer, urothelial cancer and/or other malignant tumor cell.

Technical Effects

The compounds disclosed herein have high selectivity for MNK1/2 and also have significant inhibitory activity against the kinases; in addition, the compounds have good membrane permeability and solubility, and excellent pharmacokinetic and pharmacodynamic properties.

DEFINITIONS AND DESCRIPTION

Unless otherwise stated, the following terms and phrases used herein are intended to have the following meanings. A particular term or phrase, unless otherwise specifically defined, should not be considered as uncertain or unclear, but construed according to its common meaning. When referring to a trade name, it is intended to refer to its corresponding commercial product or its active ingredient.

The term "pharmaceutically acceptable" is used herein for those compounds, materials, compositions, and/or dosage forms which are, within the scope of sound medical judgment, suitable for use in contact with the tissues of human beings and animals without excessive toxicity, irritation, allergic response, or other problems or complications, and commensurate with a reasonable benefit/risk ratio.

The term "pharmaceutically acceptable salt" refers to a salt of the compound disclosed herein, which is prepared from the compound having particular substituents disclosed herein and a relatively nontoxic acid or base. When the compound disclosed herein contains a relatively acidic functional group, a base addition salt can be obtained by contacting such a compound with a sufficient amount of a base in a pure solution or a suitable inert solvent. Pharmaceutically acceptable base addition salts include sodium, potassium, calcium, ammonium, organic amine, or magnesium salts, or similar salts. When the compound disclosed herein contains a relatively basic functional group, an acid addition salt can be obtained by contacting such a compound with a sufficient amount of an acid in a pure solution or a suitable inert solvent. Examples of pharmaceutically acceptable acid addition salts include salts derived from inorganic acids, such as hydrochloric acid, hydrobromic acid, nitric acid, carbonic acid, bicarbonate radical, phosphoric acid, monohydrogen phosphate, dihydrogen phosphate, sulfuric acid, hydrogen sulfate, hydroiodic acid and phosphorous acid and the like; and salts derived from organic acids, such as acetic acid, propionic acid, isobutyric acid, maleic acid, malonic acid, benzoic acid, succinic acid, suberic acid, fumaric acid, lactic acid, mandelic acid, phthalic acid, benzenesulfonic acid, p-toluenesulfonic acid, citric acid, tartaric acid and methanesulfonic acid and the like. Also included are salts of amino acids (e.g., arginine) and salts of organic acids such as glucuronic acid. Certain specific compounds disclosed herein contain both basic and acidic functional groups that allow the compounds to be converted into either base or acid addition salts.

The pharmaceutically acceptable salts of the present disclosure can be synthesized from a parent compound having an acidic or basic group by conventional chemical methods. In general, such salts are prepared by the following method: reacting the free acid or base form of the compound with a stoichiometric amount of the appropriate base or acid in water or an organic solvent or a mixture thereof.

The compound disclosed herein may demonstrate a specific geometric isomerism or stereoisomerism. All such compounds are contemplated herein, including cis- and trans-isomers, (−)- and (+)-enantiomers, (R)- and (S)-enantiomers, diastereoisomers, (D)-isomers, (L)-isomers, and racemic mixtures and other mixtures thereof, such as an enantiomer or diastereomer enriched mixture, all of which are encompassed within the scope of the present disclosure. Substituents such as alkyl may have an additional asymmetric carbon atom. All these isomers and mixtures thereof are encompassed within the scope of the present disclosure.

Unless otherwise stated, the term "enantiomer" or "optical isomer" refers to stereoisomers that are mirror images of each other.

Unless otherwise stated, the term "cis-trans isomer" or "geometric isomer" results from the inability of a single bond of a ring carbon atom or a double bond to rotate freely.

Unless otherwise stated, the term "diastereoisomer" refers to stereoisomers in which molecules each have two or more chiral centers and are not mirror images of each other.

Unless otherwise stated, "(+)" stands for dextrorotation, "(−)" stands for levorotation, and "(±)" stands for racemization.

Unless otherwise stated, the absolute configuration of a stereogenic center is represented by a wedged solid bond (⟋) and a wedged dashed bond (⟍), and the relative configuration of a stereogenic center is represented by a straight solid bond (⟋) and a straight dashed bond (⟍). A wavy line (⟿) represents a wedged solid bond (⟋) or a wedged dashed bond (⟍), or a wavy line (⟿) represents a straight solid bond (⟋) and a straight dashed bond (⟍).

Unless otherwise stated, the term "tautomer" or "tautomeric form" means that different functional isomers are in dynamic equilibrium at room temperature and can be rapidly converted into each other. If tautomerism is possible (e.g., in solution), the chemical equilibrium of the tautomers can be achieved. For example, a proton tautomer, also known as a prototropic tautomer, includes interconversion by proton migration, such as keto-enol isomerism and imine-enamine isomerism. A valence isomer includes interconversion by recombination of some bonding electrons. A specific example of the keto-enol tautomerism is the interconversion between the tautomers pentane-2,4-dione and 4-hydroxypent-3-en-2-one.

Unless otherwise stated, the term "enriched with one isomer", "isomer enriched", "enriched with one enantiomer" or "enantiomer enriched" means that the content of one of the isomers or enantiomers is less than 100% and more than or equal to 60%, or more than or equal to 70%, or more than or equal to 80%, or more than or equal to 90%, or more than or equal to 95%, or more than or equal to 96%, or more than or equal to 97%, or more than or equal to 98%, or more than or equal to 99%, or more than or equal to 99.5%, or more than or equal to 99.6%, or more than or equal to 99.7%, or more than or equal to 99.8% or more than or equal to 99.9%.

Unless otherwise stated, the term "isomeric excess" or "enantiomeric excess" refers to the difference between the relative percentages of two isomers or enantiomers. For example, if the content of one isomer or enantiomer is 90% and the content of the other isomer or enantiomer is 10%, the isomeric or enantiomeric excess (ee) is 80%.

Optically active (R)- and (S)-isomers and D and L isomers can be prepared by chiral synthesis or chiral reagents or other conventional techniques. If one enantiomer of a certain compound disclosed herein is to be obtained, the desired pure enantiomer can be prepared by asymmetric synthesis or derivatization using a chiral auxiliary, wherein the resulting diastereoisomeric mixture is separated and the auxiliary group is cleaved. Alternatively, when the molecule contains a basic functional group (such as amino) or an acidic functional group (such as carboxyl), the compound reacts with an appropriate optically active acid or base to form a salt of the diastereoisomer, which is then subjected to resolution of diastereoisomers through conventional methods in the art to acquire the pure enantiomer. Furthermore, the enantiomer and the diastereoisomer are generally isolated through chromatography using a chiral stationary phase, optionally in combination with chemical derivatization (e.g., carbamate generated from amines). The compounds disclosed herein may contain an unnatural proportion of atomic isotope at one or more of the atoms that constitute the compound. For example, the compound may be labeled with a radioisotope, such as tritium ($^3$H), iodine-125 ($^{125}$I), or C-14 ($^{14}$C). For another example, hydrogen can be substituted by deuterium to form a deuterated drug, and the bond formed by deuterium and carbon is firmer than that formed by common hydrogen and carbon. Compared with an un-deuterated drug, the deuterated drug has the advantages of reduced toxic side effect, increased stability, enhanced efficacy, prolonged biological half-life and the like. All isotopic variations of the compound disclosed herein, whether radioactive or not, are encompassed within the scope of the present disclosure. "Optional" or "optionally" means that the subsequently described event or circumstance may, but does not necessarily, occur, and the description includes instances where the event or circumstance occurs and instances where it does not.

The term "substituted" means that one or more hydrogen atoms on a specific atom are substituted by substituents which may include deuterium and hydrogen variants, as long as the valence of the specific atom is normal and the substituted compound is stable. When the substituent is an oxygen (i.e., =O), it means that two hydrogen atoms are substituted. Substitution with oxygen does not occur on aromatic groups. The term "optionally substituted" means that an atom can be substituted with a substituent or not. Unless otherwise specified, the type and number of the substituent may be arbitrary as long as being chemically achievable.

When any variable (e.g., R) occurs more than once in the constitution or structure of a compound, the variable is independently defined in each case. Thus, for example, if a group is substituted with 0-2 R, the group can be optionally substituted with up to two R, and the definition of R in each case is independent. Furthermore, a combination of a substituent and/or a variant thereof is permissible only if the combination can result in a stable compound.

When the number of a linking group is 0, for example, —(CRR)$_0$—, it means that the linking group is a single bond.

When one of variables is selected from single bond, the two groups bonding by this variable are bonded directly. For example, in A-L-Z, when L represents a single bond, it means that the structure is actually A-Z.

When a substituent is absent, it means that the substituent does not exist. For example, when X in A-X is absent, the structure is actually A. When it is not specified by which atom the listed substituent is connected to the group to be substituted, the substituent can be connected via any atom of the group. For example, pyridinyl as a substituent can be connected to the group to be substituted via any carbon atom on the pyridine ring.

When the enumerative linking group does not indicate the direction for linking, the direction for linking is arbitrary. For example, when the linking group L contained in

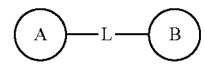

is -M-W—, -M-W— can either link ring A and ring B in a direction same as left-to-right reading order to form

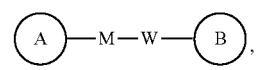, or link ring A and ring B in an opposing direction to form

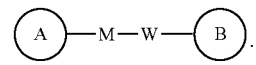.

A combination of the linking group, a substituent and/or a variant thereof is permissible only if the combination can result in a stable compound.

Unless otherwise specified, when a group has one or more connectable sites, any one or more of the sites of the group may be connected to other groups by chemical bonds. The chemical bond that connects the site to another group may be represented by a straight solid bond ($\diagup$), a straight dashed line bond ($\diagup$), or a wavy line

For example, the straight solid bond in —OCH$_3$ refers to being connected to another group via the oxygen atom in the group; the straight dashed bond in

refers to being connected to another group via two ends of the nitrogen atom in the group; the wavy line in

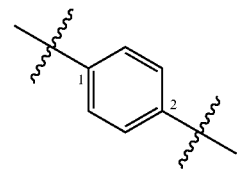 [SMILES: *c1ccc(*)cc1]

refers to being connected to another group via the carbon atoms at positions 1 and 2 in the phenyl group;

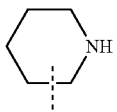

means that any connectable site on the piperidinyl can be connected to another group via 1 bond, including 4 possible connecting modes

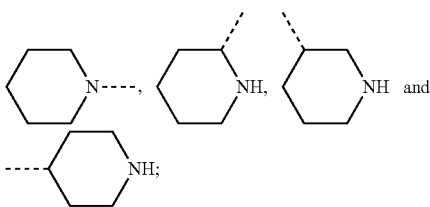

even if —N— is connected to an H atom, the —N— at the site can still be connected to another group via a bond.

Unless otherwise specified, the number of atoms on a ring is generally defined as the member number of the ring. For example, "5-7 membered ring" refers to a "ring" on which 5 to 7 atoms are arranged in a circle.

Unless otherwise specified, the term "$C_{1-3}$ alkyl" refers to a linear or branched saturated hydrocarbon group consisting of 1 to 3 carbon atoms. The $C_{1-3}$ alkyl includes, but is not limited to, $C_{1-2}$, $C_{2-3}$ alkyl, etc., and may be monovalent (e.g., methyl), divalent (e.g., methylene), or polyvalent (e.g., methenyl). Examples of $C_{1-3}$ alkyl include, but are not limited to, methyl (Me), ethyl (Et), and propyl (including n-propyl and isopropyl).

Unless otherwise specified, the terms "$C_{6-10}$ aromatic ring" and "$C_{6-10}$ aryl" of the present disclosure are used interchangeably. The term "$C_{6-10}$ aromatic ring" or "$C_{6-10}$ aryl" refers to a cyclic hydrocarbon group consisting of 6 to 10 carbon atoms and having a conjugated π-electron system. The group may be a monocyclic, fused bicyclic or fused tricyclic system, where each ring is aromatic. It may be monovalent, divalent or polyvalent, and the $C_{6-10}$ aryl includes $C_{6-9}$, $C_9$, $C_{10}$ and $C_6$ aryl groups, etc. Examples of $C_{6-10}$ aryl include, but are not limited to, phenyl, naphthyl (including 1-naphthyl, 2-naphthyl, etc.).

Unless otherwise specified, $C_{n-n+m}$ or $C_n$-$C_{n+m}$ includes any one of the specific cases of n to n+m carbon atoms. For example, $C_{1-12}$ includes $C_1$, $C_2$, $C_3$, $C_4$, $C_5$, $C_6$, $C_7$, $C_8$, $C_9$, $C_{10}$, $C_{11}$ and $C_{12}$. Also, any range within n to n+m may be included. For example, $C_{1-12}$ includes $C_{1-3}$, $C_{1-6}$, $C_{1-9}$, $C_{3-6}$, $C_{3-9}$, $C_{3-12}$, $C_{6-9}$, $C_{6-12}$ and $C_{9-12}$, etc. Similarly, n–n+m membered represents that the number of atoms on the ring is n to n+m. For example, 3-12 membered ring includes 3 membered ring, 4 membered ring, 5 membered ring, 6 membered ring, 7 membered ring, 8 membered ring, 9 membered ring, 10 membered ring, 11 membered ring and 12 membered ring. n–n+m membered also represents any range within n to n+m. For example, 3-12 membered ring includes 3-6 membered ring, 3-9 membered ring, 5-6 membered ring, 5-7 membered ring, 6-7 membered ring, 6-8 membered ring, 6-10 membered ring, etc.

The term "leaving group" refers to a functional group or atom that can be replaced by another functional group or atom through a substitution reaction (e.g., nucleophilic substitution). For example, representative leaving groups include triflate; chlorine, bromine and iodine; sulfonate groups, such as mesylate, tosylate, p-bromobenzenesulfonate and p-toluenesulfonate; acyloxy groups, such as acetoxy, and trifluoroacetoxy.

The term "protecting group" includes, but is not limited to, "amino protecting group", "hydroxyl protecting group" or "sulfydryl protecting group". The term "amino protective group" refers to a protective group suitable for preventing side reactions at the nitrogen site of the amino. Representative amino protective groups include, but are not limited to: formyl; acyl, such as alkanoyl (such as acetyl, trichloroacetyl or trifluoroacetyl); alkoxycarbonyl, such as t-butoxycarbonyl (Boc); arylmethyloxycarbonyl, such as benzyloxycarbonyl (Cbz) and 9-fluorenylmethyloxycarbonyl (Fmoc); arylmethyl, such as benzyl (Bn), trityl (Tr), 1,1-di-(4'-methoxyphenyl)methyl; and silyl, such as trimethylsilyl (TMS) and t-butyldimethylsilyl (TBS). The term "hydroxyl protecting group" refers to a protecting group suitable for preventing side reactions of the hydroxyl group. Representative hydroxyl protecting groups include, but are not limited to: alkyl, such as methyl, ethyl, and tert-butyl; acyl, such as alkanoyl (such as acetyl); arylmethyl, such as benzyl (Bn), p-methoxybenzyl (PMB), 9-fluorenylmethyl (Fm) and diphenylmethyl (DPM); and silyl, such as trimethylsilyl (TMS) and tert-butyldimethylsilyl (TBS).

The structures of the compounds disclosed herein can be confirmed by conventional methods well known to those skilled in the art, and if the present disclosure relates to an absolute configuration of the compound, the absolute configuration can be confirmed by means of conventional techniques in the art. For example, by a single crystal X-ray diffraction (SXRD), diffraction intensity data of the obtained single crystal are collected using a Bruker D8 venture diffractometer in the CuKα radiation, by (p/w scanning. After the data collection, the crystal structure is further analyzed using a direct method (Shelxs97), so as to confirm the absolute configuration.

The compounds disclosed herein can be prepared by a variety of synthetic methods well known to those skilled in the art, including the specific embodiments listed below, embodiments formed by combinations thereof with other chemical synthetic methods, and equivalents thereof known to those skilled in the art. Preferred embodiments include, but are not limited to, the examples of the present disclosure.

The solvents used in the present disclosure are commercially available and can be used without further purification. The reaction is generally performed in an anhydrous solvent under inert nitrogen atmosphere.

The following abbreviations are used herein: MeOH-$d_4$ represents deuterated methanol; CDCl$_3$ represents deuterated chloroform; DMSO-$d_6$ represents deuterated dimethyl sulfoxide; D$_2$O represents deuterated water; Piv represents pivaloyl; DBU represents 1,8-diazabicyclo[5.4.0]undec-7-ene.

Compounds disclosed herein are named according to conventional nomenclature rules in the art or using ChemDraw® software, and supplier's catalog names are given for commercially available compounds.

DETAILED DESCRIPTION

The present disclosure is described in detail below by way of examples. However, this is by no means disadvantageously limiting the scope of the present disclosure. Although the present disclosure has been described in detail herein and specific examples have also been disclosed, it will be apparent to those skilled in the art that various changes and modifications can be made to the specific examples without departing from the spirit and scope of the present disclosure. The hydrochloride or the trifluoroacetate of the compound disclosed herein is added with saturated sodium bicarbonate solution to adjust the pH value to be neutral, and then the free base of the compound is obtained by high performance liquid chromatography separation (neutral, ammonium bicarbonate system).

Example 1

Compound 1

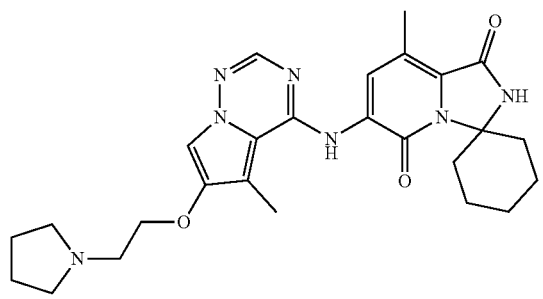

Synthetic Route:

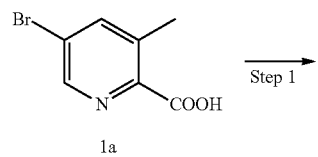
1a

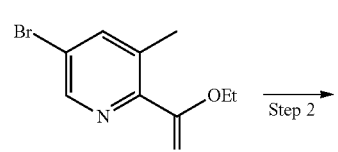
1b

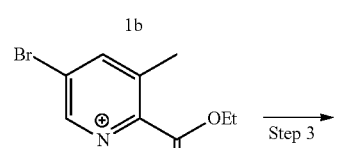
1c

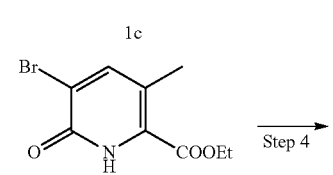
1d

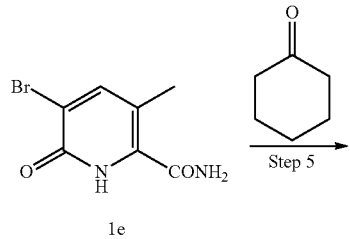
1e

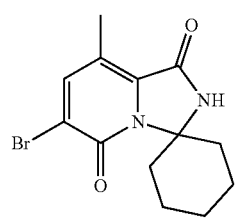
1f

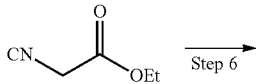
1g

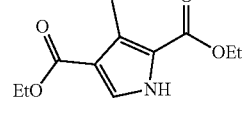
1h

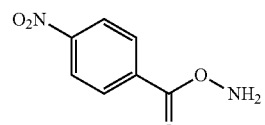
1j

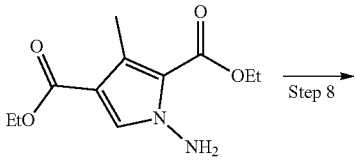
1k

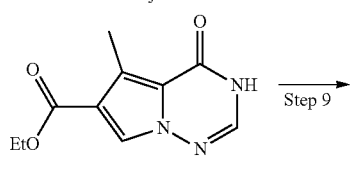
1l

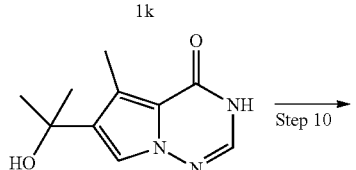
1m

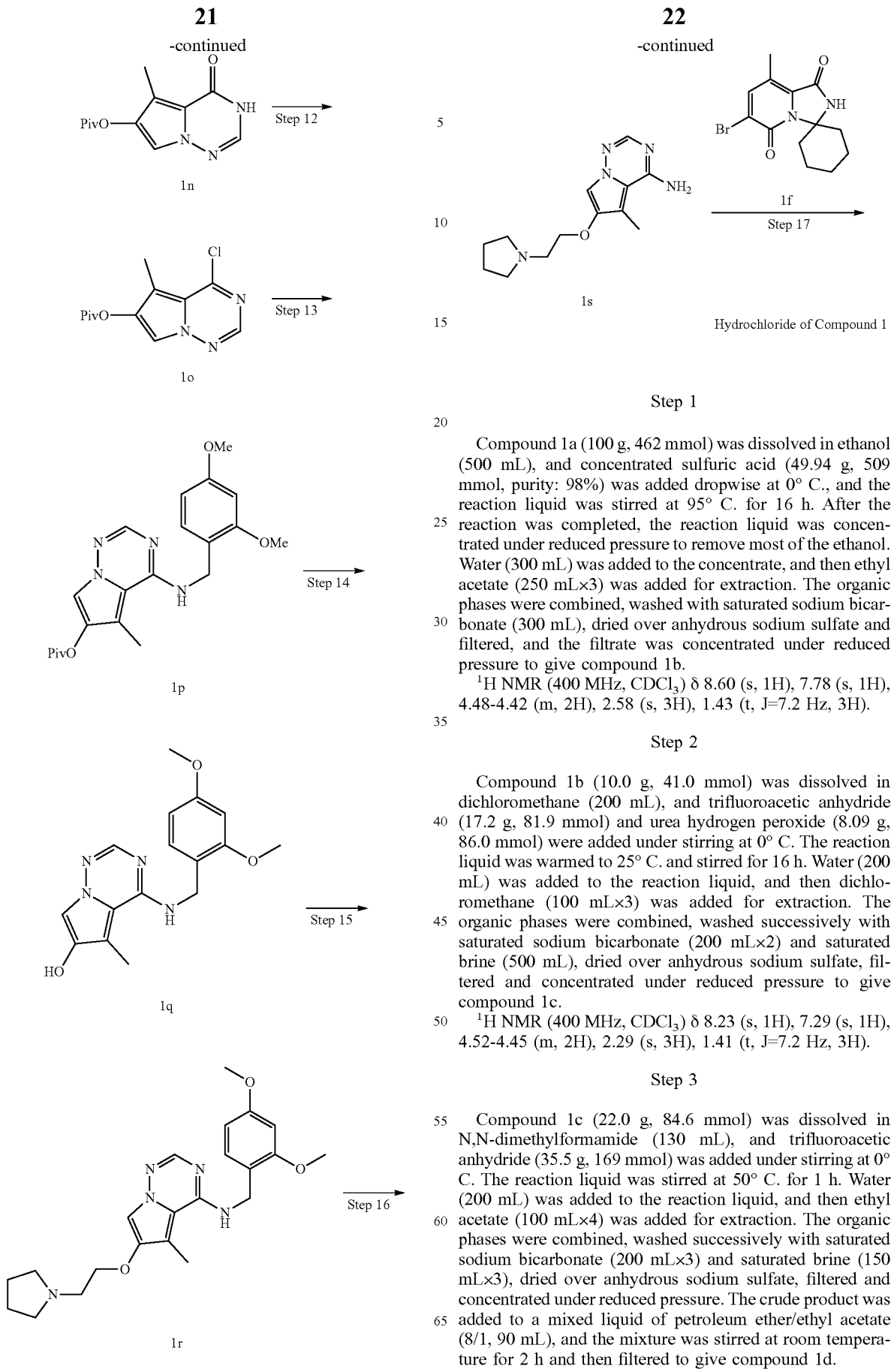

Step 1

Compound 1a (100 g, 462 mmol) was dissolved in ethanol (500 mL), and concentrated sulfuric acid (49.94 g, 509 mmol, purity: 98%) was added dropwise at 0° C., and the reaction liquid was stirred at 95° C. for 16 h. After the reaction was completed, the reaction liquid was concentrated under reduced pressure to remove most of the ethanol. Water (300 mL) was added to the concentrate, and then ethyl acetate (250 mL×3) was added for extraction. The organic phases were combined, washed with saturated sodium bicarbonate (300 mL), dried over anhydrous sodium sulfate and filtered, and the filtrate was concentrated under reduced pressure to give compound 1b.

$^1$H NMR (400 MHz, CDCl$_3$) δ 8.60 (s, 1H), 7.78 (s, 1H), 4.48-4.42 (m, 2H), 2.58 (s, 3H), 1.43 (t, J=7.2 Hz, 3H).

Step 2

Compound 1b (10.0 g, 41.0 mmol) was dissolved in dichloromethane (200 mL), and trifluoroacetic anhydride (17.2 g, 81.9 mmol) and urea hydrogen peroxide (8.09 g, 86.0 mmol) were added under stirring at 0° C. The reaction liquid was warmed to 25° C. and stirred for 16 h. Water (200 mL) was added to the reaction liquid, and then dichloromethane (100 mL×3) was added for extraction. The organic phases were combined, washed successively with saturated sodium bicarbonate (200 mL×2) and saturated brine (500 mL), dried over anhydrous sodium sulfate, filtered and concentrated under reduced pressure to give compound 1c.

$^1$H NMR (400 MHz, CDCl$_3$) δ 8.23 (s, 1H), 7.29 (s, 1H), 4.52-4.45 (m, 2H), 2.29 (s, 3H), 1.41 (t, J=7.2 Hz, 3H).

Step 3

Compound 1c (22.0 g, 84.6 mmol) was dissolved in N,N-dimethylformamide (130 mL), and trifluoroacetic anhydride (35.5 g, 169 mmol) was added under stirring at 0° C. The reaction liquid was stirred at 50° C. for 1 h. Water (200 mL) was added to the reaction liquid, and then ethyl acetate (100 mL×4) was added for extraction. The organic phases were combined, washed successively with saturated sodium bicarbonate (200 mL×3) and saturated brine (150 mL×3), dried over anhydrous sodium sulfate, filtered and concentrated under reduced pressure. The crude product was added to a mixed liquid of petroleum ether/ethyl acetate (8/1, 90 mL), and the mixture was stirred at room temperature for 2 h and then filtered to give compound 1d.

¹H NMR (400 MHz, CDCl₃) δ 9.89 (br s, 1H), 7.75 (s, 1H), 4.46-4.41 (m, 2H), 2.44 (s, 3H), 1.43 (t, J=7.2 Hz, 3H).

Step 4

Compound 1d (2.00 g, 7.69 mmol) was dissolved in ethanol (20 mL), and aqueous ammonia (16.2 g, 115 mmol, purity: 25%) was added. The reaction liquid was stirred at 40° C. for 16 h. The reaction liquid was concentrated under reduced pressure, and the crude product was added to a mixed liquid of methanol/dichloromethane (1/5, 48 mL). The mixture was stirred overnight at room temperature, then filtered and washed with dichloromethane (5 mL×2). The filter cake was concentrated under reduced pressure to give compound 1e.

MS-ESI, [M+H]⁺, calculated 231 and 233, found 231 and 233.

Step 5

Compound 1e (37.0 g, 67.3 mmol) and cyclohexanone (26.4 g, 269 mmol) were dissolved in dioxane (400 mL), and concentrated sulfuric acid (3.30 g, 33.6 mmol, purity: 98%) was added dropwise under stirring. The reaction liquid was stirred at 95° C. for 3 h. The reaction liquid was concentrated under reduced pressure, and the crude product was added to ethyl acetate (100 mL), and the mixture was stirred for 3 h at room temperature and filtered. The filter cake was added to saturated sodium bicarbonate solution (350 mL), and the mixture was stirred for 1 h at room temperature and filtered. The filter cake was dried under reduced pressure to give compound 1f. MS-ESI, [M+H]⁺, calculated: 311 and 313, found: 311 and 313.

Step 6

Compound 1g (50 g, 0.442 mol), 1,8-diazabicyclo[5.4.0]undec-7-ene (DBU, 67.3 g, 0.442 mol) were dissolved in tetrahydrofuran (500 mL). The reaction liquid was heated to 55° C., and acetaldehyde (9.74 g, 0.221 mol) was added at this temperature. The reaction liquid was stirred at 55° C. for 18 h. Then the reaction liquid was cooled to 22° C., and quenched with acetic acid (25 mL). The reaction liquid was concentrated under reduced pressure, and the residue was dissolved in ethyl acetate (1000 mL) and diluted hydrochloric acid (1000 mL, 1 M). The organic phase was retained after liquid separation, and the aqueous phase was extracted with ethyl acetate (300 mL×3). The organic phases were combined, washed successively with saturated sodium bicarbonate solution (100 mL) and brine (200 mL), dried over anhydrous sodium sulfate, filtered and concentrated, and the crude product was separated by column chromatography (4/1, petroleum ether/ethyl acetate, Rf=0.56) to give compound 1h.

MS-ESI, [M+H]⁺, calculated: 226, found: 226. ¹H NMR (400 MHz, CDCl₃) δ 9.29 (br s, 1H), 7.48 (d, J=3.2 Hz, 1H), 4.35 (q, J=7.2 Hz, 2H), 4.29 (q, J=7.2 Hz, 2H), 2.61 (s, 3H), 1.38 (t, J=7.2 Hz, 3H), 1.35 (m, J=7.2 Hz, 3H).

Step 7

Compound 1h (11.0 g, 48.8 mmol) was dissolved in N-methylpyrrolidone (60 mL), and potassium tert-butoxide (6.03 g, 53.7 mmol) was added to the reaction liquid. After the reaction liquid was stirred at 25° C. for 0.5 h, a solution of compound 1i (9.78 g, 53.7 mmol) in N-methylpyrrolidone (30 mL) was added. The reaction liquid was further stirred for 20 h. The reaction liquid was washed with water (200 mL) and extracted with ethyl acetate (200 mL×3). The organic phases were combined, washed with saturated brine (20 mL×3), dried over anhydrous sodium sulfate, filtered and concentrated, and the crude product was separated by column chromatography (4/1, petroleum ether/ethyl acetate, Rf=0.55) to give compound 1j.

MS-ESI, [M+H]⁺, calculated: 241, found: 241. ¹H NMR (400 MHz, CDCl₃) δ7.49 (s, 1H), 4.35 (q, J=7.2 Hz, 2H), 4.27 (q, J=7.2 Hz, 2H), 2.57 (s, 3H), 1.40 (t, J=7.2 Hz, 3H), 1.34 (t, J=7.2 Hz, 3H).

Step 8

Compound 1j (10.2 g, 42.5 mmol) was dissolved in formamide (120 mL), and phosphoric acid (832 mg, 8.49 mmol) was added to the reaction liquid. The reaction liquid was stirred at 125° C. for 16 h. Then the reaction liquid was cooled to 22° C., and a large amount of white solid was precipitated out here. The mixture was filtered, and the collected filter cake was added to a mixed solution of petroleum ether/ethyl acetate (1/1, 100 mL). The resulting mixture was stirred at 30° C. for 0.5 h and then filtered to give compound 1k.

MS-ESI, [M+H]⁺, calculated: 222, found: 222. ¹H NMR (400 MHz, DMSO-d₆) δ 7.90 (s, 1H), 7.84 (s, 1H), 4.23 (q, J=7.2 Hz, 2H), 2.61 (s, 3H), 1.28 (t, J=7.2 Hz, 3H).

Step 9

Compound 1k (4.00 g, 18.0 mmol) was dissolved in anhydrous tetrahydrofuran (50 mL). Methylmagnesium bromide (30.1 mL, 90.3 mmol) was added dropwise to the reaction liquid at 25° C. After the dropwise addition was completed, the reaction liquid was warmed to 25° C. and stirred for 15 h. The reaction liquid was quenched with saturated ammonium chloride solution (100 mL), and extracted with ethyl acetate (50 mL×5). The organic phases were combined, washed with saturated brine (10 mL×1), dried over anhydrous sodium sulfate, filtered and concentrated under reduced pressure, and the crude product was separated by thin layer chromatography (2/1, petroleum ether/ethyl acetate, Rf=0.39) to give compound 1l.

MS-ESI, [M+H]⁺, calculated: 208, found: 208.
¹H NMR (400 MHz, CDCl₃) 7.30 (br s, 1H), 7.24 (br s, 1H), 2.59 (s, 3H), 1.54 (s, 6H).

Step 10

Compound 1l (1.00 g, 4.83 mmol) and hydrogen peroxide (4.64 mL, 48.26 mmol, content: 30%) were dissolved in anhydrous tetrahydrofuran (30 mL). A cold solution of methanesulfonic acid (3.44 mL, 48.26 mmol) in water (10 mL) was added dropwise to the reaction liquid at 0° C. The reaction liquid was stirred at 0° C. for 1 h. The reaction liquid was quenched with 10% aqueous sodium sulfite solution (15 mL) until potassium iodide starch test paper showed negative. Then ethyl acetate (50 mL×3) was added for extraction. The organic phases were combined, washed with saturated brine (10 mL×1), dried over anhydrous sodium sulfate, filtered and concentrated under reduced pressure, and the crude product was separated by column chromatography (2/1, petroleum ether/ethyl acetate, Rf=0.38) to give compound 1m.

MS-ESI, [M+H]⁺, calculated: 166, found: 166.

Step 11

Compound 1m (400 mg, 2.42 mmol) was dissolved in anhydrous tetrahydrofuran (10 mL), and triethylamine (0.674 mL, 4.84 mmol) and pivaloyl chloride (350 mg, 4.84 mmol) were added to the reaction liquid. The reaction liquid was stirred at 0° C. for 1 h, washed with water (10 mL), and extracted with ethyl acetate (10 mL×5). The organic phases were combined, washed with saturated brine (10 mL×1), dried over anhydrous sodium sulfate, filtered and concentrated under reduced pressure, and the crude product was separated by thin layer chromatography (2/1, petroleum ether/ethyl acetate, Rf=0.63) to give compound 1n.

MS-ESI, [M+H]$^+$, calculated: 250, found: 250. $^1$H NMR (400 MHz, MeOH-d$_4$) 7.61 (s, 1H), 7.47 (s, 1H), 2.34 (s, 3H), 1.38 (s, 9H).

Step 12

Compound in (450 mg, 1.81 mmol) was dissolved in phosphorus oxychloride (8.85 mL). The reaction liquid was stirred at 100° C. for 1 h. The reaction liquid was then cooled to room temperature and poured into saturated ammonium bicarbonate solution (300 mL). The mixture was extracted with dichloromethane (50 mL×3), and the organic phases were combined, washed with saturated brine (20 mL×1), dried over anhydrous sodium sulfate, filtered and concentrated to give compound to.

MS-ESI, [M+H]$^+$, calculated: 268, found: 268.

Step 13

Compound to (2.00 g, 7.47 mmol), 2,4-dimethoxybenzylamine (1.87 g, 11.21 mmol) and triethylamine (2.27 g, 22.4 mmol) were dissolved in anhydrous tetrahydrofuran (30 mL). The reaction liquid was stirred at 70° C. for 1 h. The reaction liquid was then concentrated under reduced pressure to give crude compound 1p.

MS-ESI, [M+H]$^+$, calculated: 399, found: 399.

Step 14

Compound 1p (3.50 g, 8.78 mmol) was dissolved in methanol (3 mL) and tetrahydrofuran (20 mL), and a solution of sodium hydroxide (703 mg, 17.6 mmol) in water (20 mL) was added to the reaction liquid. The reaction liquid was stirred at 25° C. for 0.5 h. The reaction liquid was concentrated to remove the organic solvent, and the aqueous phase was adjusted to pH=7 with diluted aqueous hydrochloric acid solution (1 M) and the mixture was extracted with dichloromethane (50 mL×3). The organic phases were combined, washed with saturated brine (10 mL×1), dried over anhydrous sodium sulfate, filtered and concentrated under reduced pressure, and the crude product was separated by column chromatography (2/1, petroleum ether/ethyl acetate, Rf=0.32) to give compound 1q. MS-ESI, [M+H]$^+$, calculated: 315, found: 315. $^1$H NMR (400 MHz, MeOH-d$_4$) δ 7.67 (s, 1H), 7.21 (d, J=8.4 Hz, 1H), 7.07 (s, 1H), 6.56 (d, J=2.4 Hz, 1H), 6.47 (dd, J=2.4, 8.4 Hz, 1H), 4.66 (s, 2H), 3.90 (s, 3H), 3.79 (s, 3H), 2.36 (s, 3H).

Step 15

Compound 1q (350 mg, 1.11 mmol) was dissolved in N,N-dimethylformamide (10 mL), and sodium hydroxide (89.1 mg, 2.23 mmol) and 1-(2-bromoethyl)pyrrolidine (238 mg, 1.34 mmol) were added. The reaction liquid was stirred at 50° C. for 2.5 h. The reaction liquid was added with water (10 mL), and extracted with ethyl acetate (20 mL×4). The organic phases were combined, washed with saturated brine (50 mL×3), dried over anhydrous sodium sulfate, filtered and concentrated under reduced pressure, and the residue was separated by column chromatography (10/1, dichloromethane/methanol, Rf=0.28) to give compound 1r.

MS-ESI, [M+H]$^+$, calculated: 412, found: 412.

Step 16

Compound 1r (190 mg, 462 μmol) was added to trifluoroacetic acid (5 mL), and the reaction liquid was stirred at 100° C. for 24 h. The reaction liquid was then directly concentrated under reduced pressure. The residue was purified by high performance liquid chromatography (trifluoroacetic acid system) to give the trifluoroacetate of compound 1s.

MS-ESI, [M+H]$^+$, calculated: 262, found: 262.

Step 17

Compound 1f (91.2 mg, 0.293 mmol), methanesulfonato (2-dicyclohexylphosphino-3,6-dimethoxy-2,4,6-tri-isopropyl-1,1-biphenyl)(2-amino-1,1-biphenyl-2-yl)palladium(II) (24.2 mg, 26.6 μmol) and cesium carbonate (217 mg, 0.666 mmol) were added to a solution of the trifluoroacetate of compound is (100 mg, 0.266 mmol) in anhydrous dioxane (5 mL). The reaction liquid was purged with nitrogen three times and stirred at 95° C. for 16 h. The reaction liquid was then cooled to room temperature and concentrated under reduced pressure, and the residue was purified by high performance liquid chromatography (hydrochloric acid system) to give the hydrochloride of compound 1.

MS-ESI, [M+H]$^+$, calculated: 492, found: 492. $^1$H NMR (400 MHz, DMSO-d$_6$) δ 10.23 (s, 1H), 8.93 (s, 1H), 8.67 (s, 1H), 8.13 (s, 1H), 7.82 (s, 1H), 4.35-4.34 (m, 2H), 3.62-3.61 (m, 4H), 3.22-3.13 (m, 6H), 2.97-2.93 (m, 2H), 2.04-1.91 (m, 4H), 1.75-1.67 (m, 6H), 1.51-1.48 (m, 2H), 1.29-1.23 (m, 2H).

Example 2

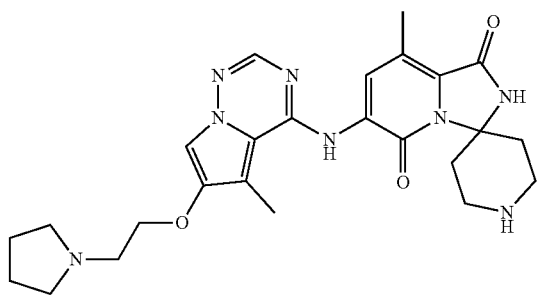

Compond 2

Synthetic Route:

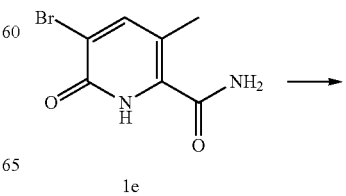

1e

-continued

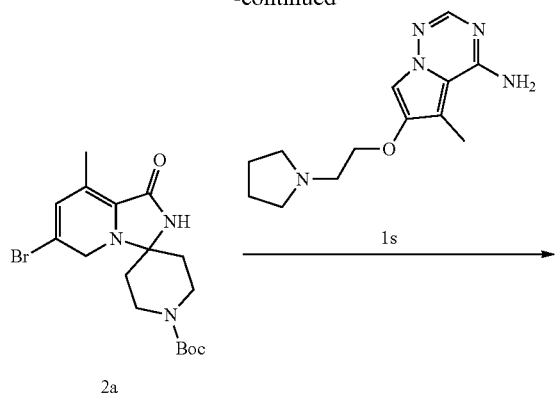

2a

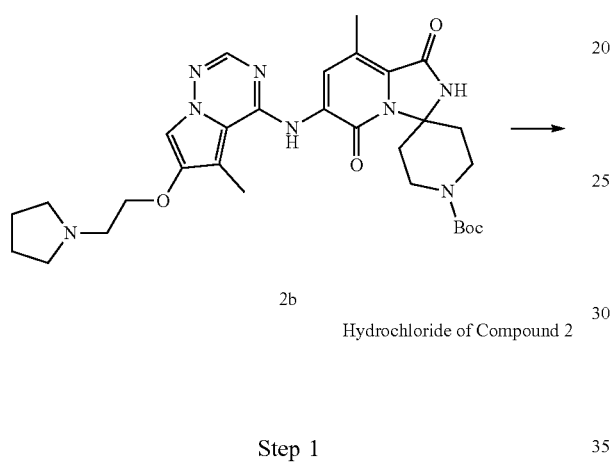

2b
Hydrochloride of Compound 2

Step 1

Compound 1e (500 mg, 2.16 mmol) and N-tert-butoxycarbonyl-4-piperidone (1.72 g, 8.66 mmol) were dissolved in dioxane (10 mL), and concentrated sulfuric acid (106 mg, 1.08 mmol, purity: 98%) was added dropwise under stirring. The reaction liquid was stirred at 95° C. for 16 h. The reaction liquid was then concentrated under reduced pressure, and the crude product was added to ethyl acetate (20 mL). The mixture was stirred at room temperature for 1 h, filtered and concentrated under reduced pressure to give compound 2a.

MS-ESI, [M+Na]$^+$, calculated: 434 and 436, found: 434 and 436.

Step 2

The trifluoroacetate of compound is (100 mg, 266 µmol) was dissolved in anhydrous dioxane (5 mL), and compound 2a (157 mg, 293 µmol), tris(dibenzylideneacetone)dipalladium (24.4 mg, 26.6 µmol), 4,5-bis(diphenylphosphino)-9,9-dimethylxanthene (30.8 mg, 53.3 µmol) and cesium carbonate (304 mg, 0.932 mmol) were added. The reaction liquid was purged with nitrogen three times and then stirred at 110° C. for 16 h. The reaction liquid was then directly concentrated under reduced pressure, and the residue was purified by column chromatography (10/1, dichloromethane/methanol, Rf=0.35) and concentrated to remove the eluent, thus giving compound 2b.

MS-ESI, [M+H]$^+$, calculated: 593, found: 593.

Step 3

Compound 2b (150 mg, 132 µmol) was dissolved in trifluoroacetic acid (2 mL), and the reaction liquid was stirred at 25° C. for 1 h. The reaction liquid was then directly concentrated under reduced pressure, and the residue was purified by high performance liquid chromatography (hydrochloric acid system) to give the hydrochloride of compound 2.

MS-ESI, [M+H]$^+$, calculated: 493, found: 493. $^1$H NMR (400 MHz, DMSO-d$_6$) δ 11.09 (s, 1H), 10.55 (s, 1H), 9.60 (s, 1H), 8.68 (s, 1H), 8.13 (s, 1H), 7.83 (s, 1H), 4.40-4.38 (m, 2H), 3.60-3.59 (m, 4H), 3.47-3.37 (m, 4H), 3.28-3.25 (m, 2H), 3.12-3.08 (m, 2H), 2.53-2.52 (m, 6H), 2.02-1.89 (m, 4H), 1.84-1.81 (m, 2H).

Example 3

Compound 3

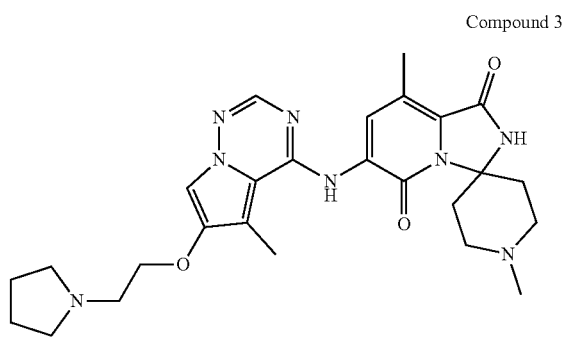 [SMILES: Cc1cc(Nc2ncnn3cc(OCCN4CCCC4)c(C)c23)c(=O)n2c1C(=O)NC21CCN(C)CC1]

Synthetic Route:

Hydrochloride of Compound 2→Hydrochloride of Compound 3

Step 1

The hydrochloride of compound 2 (40.0 mg, 75.6 µmol) was dissolved in methanol (2 mL) and dichloromethane (2 mL), and then aqueous formaldehyde solution (18.4 mg, 0.226 mmol, purity: 37%), acetic acid (7.72 mg, 0.128 mmol) and sodium borohydride acetate (64.1 mg, 0.302 mol) were added. The reaction liquid was stirred at 25° C. for 16 h. The reaction liquid was then directly concentrated under reduced pressure. The residue was purified by high performance liquid chromatography (hydrochloric acid system) to give the hydrochloride of compound 3.

MS-ESI, [M+H]$^+$, calculated: 507, found: 507. $^1$H NMR (400 MHz, D$_2$O) δ 7.67 (s, 1H), 7.51 (s, 1H), 6.93 (s, 1H), 3.87-3.86 (m, 2H), 3.78-3.76 (m, 2H), 3.68-3.66 (m, 2H), 3.52-3.51 (m, 2H), 3.31-3.30 (m, 4H), 3.19-3.13 (m, 2H), 2.95 (s, 3H), 2.17-2.13 (m, 2H), 2.10 (s, 3H), 1.99-1.90 (m, 4H), 1.83 (s, 3H).

Example 4

Compound 4

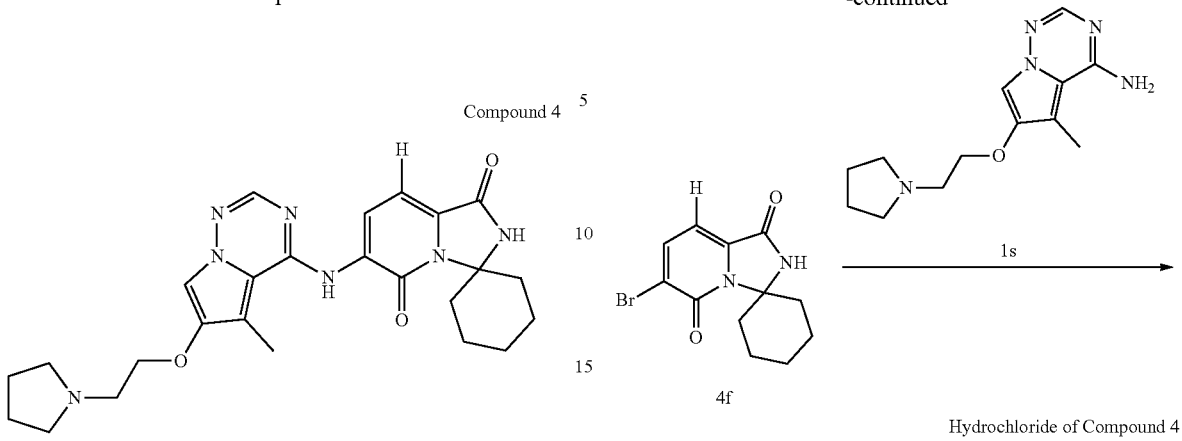

Synthetic Route:

Step 1

Reference was made to step 1 of Example 1 to give compound 4b. $^1$H NMR (400 MHz, CDCl$_3$) δ 8.81 (d, J=1.6 Hz, 1H), 8.03 (d, J=8.4 Hz, 1H), 7.98 (dd, J=1.6, 8.4 Hz, 1H), 4.48 (q, J=7.2 Hz, 2H), 1.44 (t, J=7.2 Hz, 3H).

Step 2

Reference was made to step 2 of Example 1 to give compound 4c. $^1$H NMR (400 MHz, CDCl$_3$) δ 8.40 (d, J=1.6 Hz, 1H), 7.51 (d, J=8.4 Hz, 1H), 7.40 (dd, J=1.6, 8.4 Hz, 1H), 4.46 (q, J=7.2 Hz, 2H), 1.41 (t, J=7.2 Hz, 3H).

Step 3

Reference was made to step 3 of Example 1 to give compound 4d. MS-ESI, [M+H]$^+$, calculated: 246 and 248, found: 246 and 248.

Step 4

Reference was made to step 4 of Example 1 to give compound 4e. MS-ESI, [M+H]$^+$, calculated: 217 and 219, found: 217 and 219.

Step 5

Reference was made to step 5 of Example 1 to give compound 4f. MS-ESI, [M+H]$^+$, calculated: 297 and 299, found: 297 and 299.

Step 6

The trifluoroacetate of compound is (40.0 mg, 0.107 mmol) was dissolved in anhydrous dioxane (2 mL), and compound 4f (35.2 mg, 0.117 mmol), tris(dibenzylideneacetone)dipalladium (9.76 mg, 10.7 μmol), 4,5-bis(diphenylphosphino)-9,9-dimethylxanthene (12.3 mg, 21.3 μmol) and cesium carbonate (121 mg, 0.373 mmol) were added. The reaction liquid was purged with nitrogen three times and then stirred at 110° C. for 16 h. The reaction liquid was then directly concentrated under reduced pressure, and the crude product was separated and purified by column chromatography (10/1, dichloromethane/methanol, Rf=0.32), and the resulting crude product was purified by high performance liquid chromatography (hydrochloride) to give the hydrochloride of compound 4.

MS-ESI, [M+H]+, calculated: 478, found: 478. ¹H NMR (400 MHz, DMSO-d₆) δ 11.12 (s, 1H), 10.38 (s, 1H), 8.84 (s, 1H), 8.10 (s, 1H), 7.83 (s, 1H), 6.97 (s, 1H), 4.74-4.70 (m, 2H), 3.60 (s, 4H), 3.11-2.96 (m, 4H), 2.66 (s, 3H), 2.02-1.91 (m, 4H), 1.76-1.67 (m, 4H), 1.53-1.51 (m, 2H), 1.30-1.24 (m, 2H).

Example 5

Compound 5

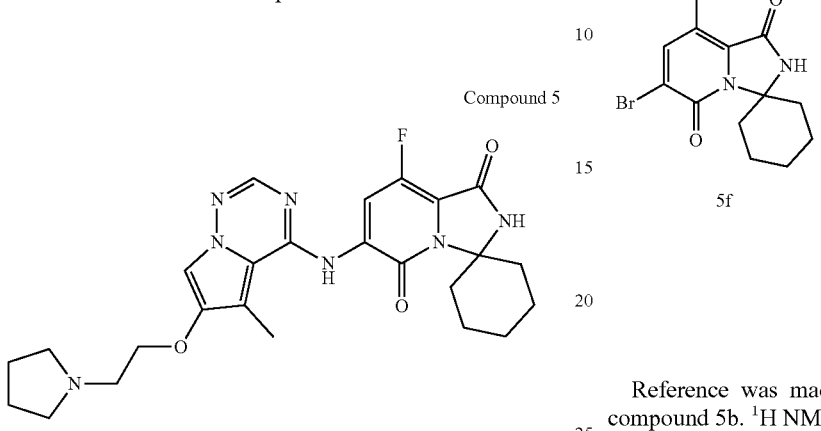

Synthetic Route:

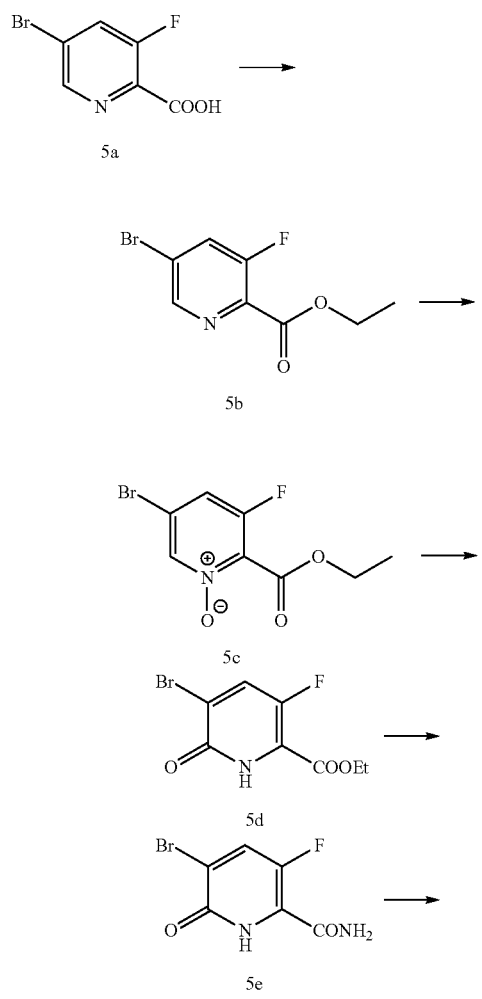

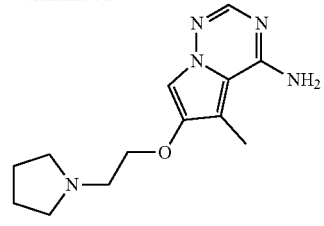

Hydrochloride of Compound 5

Step 1

Reference was made to step 1 of Example 1 to give compound 5b. ¹H NMR (400 MHz, CDCl₃) δ 8.62 (d, J=0.8 Hz, 1H), 7.77 (dd, J=1.6, 9.2 Hz, 1H), 4.49 (q, J=7.2 Hz, 2H), 1.44 (t, J=7.2 Hz, 4H).

Step 2

Reference was made to step 2 of Example 1 to give compound 5c. [M+H]+, calculated: were 264 and 266, found: 264 and 266.

Step 3

Reference was made to step 3 of Example 1 to give compound 5d. ¹H NMR (400 MHz, CDCl₃) δ 7.84 (d, J=8.4 Hz, 1H), 4.47 (q, J=7.2 Hz, 2H), 1.43 (t, J=7.2 Hz, 3H).

Step 4

Reference was made to step 4 of Example 1 to give compound 5e. MS-ESI, [M+H]+, calculated: 235 and 237, found: 235 and 237.

Step 5

Reference was made to step 5 of Example 1 to give compound 5f. MS-ESI, [M+H]+, calculated: 315 and 317, found: 315 and 317.

Step 6

The trifluoroacetate of compound is (40.0 mg, 0.107 mmol) was dissolved in anhydrous dioxane (2 mL), and compound 15f (38.9 mg, 0.117 mmol), tris(dibenzylideneacetone)dipalladium (9.76 mg, 10.6 μmol), 4,5-bis(diphenylphosphino)-9,9-dimethylxanthene (12.3 mg, 21.3 μmol) and cesium carbonate (121 mg, 0.373 mmol) were added. The reaction liquid was purged with nitrogen three times and then stirred at 110° C. for 16 h. The reaction liquid was then directly concentrated under reduced pressure, and the crude product was separated and purified by column chromatography (10/1, dichloromethane/methanol, Rf=0.32), and the resulting crude product was purified by high performance liquid chromatography (hydrochloric acid system) to give the hydrochloride of compound 5. MS-ESI, [M+H]+, calculated: 496, found: 496. $^1$H NMR (400 MHz, DMSO-d$_6$) δ 10.27 (s, 1H), 8.96 (s, 1H), 8.82 (d, J=10.8 Hz, 1H), 8.17 (s, 1H), 7.88 (s, 1H), 4.36-4.34 (m, 2H), 3.62 (s, 4H), 3.17-3.14 (m, 2H), 2.92-2.89 (m, 2H), 2.53 (s, 3H), 2.07-2.02 (m, 2H), 1.92-1.90 (m, 2H), 1.79-1.75 (m, 2H), 1.68-1.65 (m, 2H), 1.61-1.58 (m, 3H), 1.29-1.23 (s, 1H).

Example 6

Compound 6

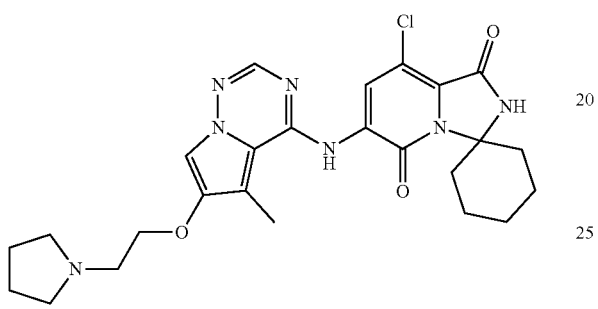

Synthetic Route:

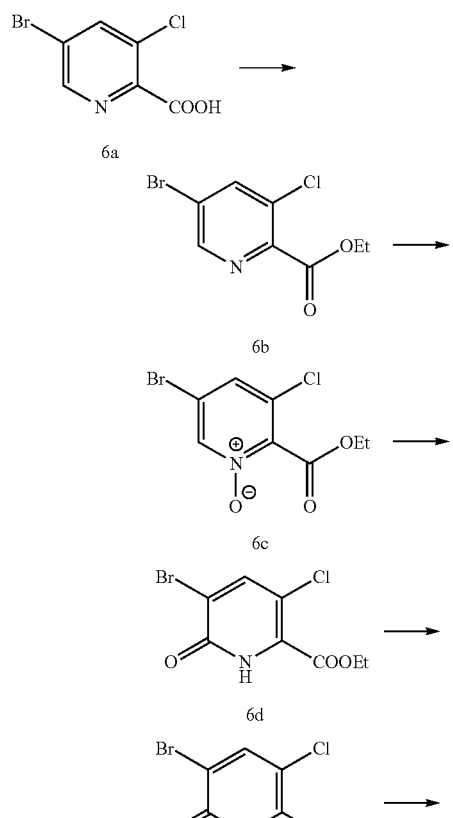

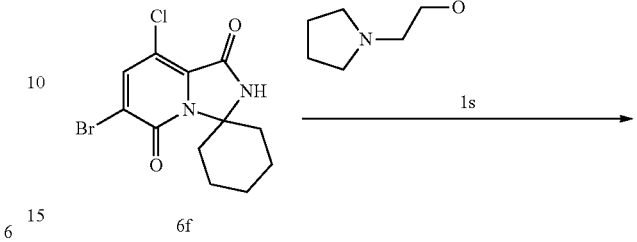

Hydrochloride of Compound 6

Step 1

Reference was made to step 1 of Example 1 to give compound 6b. MS-ESI, [M+H]$^+$, calculated: 264 and 266, found: 264 and 266.

Step 2

Reference was made to step 2 of Example 1 to give compound 6c. MS-ESI, [M+H]$^+$, calculated: 280 and 282, found: 280 and 282.

Step 3

Reference was made to step 3 of Example 1 to give compound 6d. MS-ESI, [M+H]$^+$, calculated: 280 and 282, found: 280 and 282.

Step 4

Reference was made to step 4 of Example 1 to give compound 6e. MS-ESI, [M+H]$^+$, calculated: 251 and 253, found: 251 and 253.

Step 5

Reference was made to step 5 of Example 1 to give compound 6f. MS-ESI, [M+H]$^+$, calculated: 331 and 333, found: 331 and 333.

Step 6

Reference was made to step 6 of Example 4 to give the hydrochloride of compound 6. MS-ESI, [M+H]$^+$, calculated: 512, found: 512. $^1$H NMR (400 MHz, DMSO-d$_6$) δ 10.71 (s, 1H), 10.45 (s, 1H), 8.80 (br s, 1H), 8.18 (br s, 1H), 7.87 (br s, 1H), 4.37 (br s, 2H), 3.66-3.65 (m, 4H), 3.12 (br s, 2H), 2.91 (br s, 2H), 2.55 (s, 3H), 2.04-2.00 (m, 2H), 1.93-1.87 (m, 2H), 1.78-1.74 (m, 2H), 1.65-1.58 (m, 5H), 1.26-1.21 (m, 1H).

Example 7

Compound 7

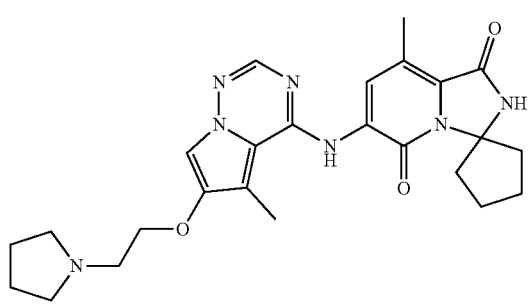

Synthetic Route:

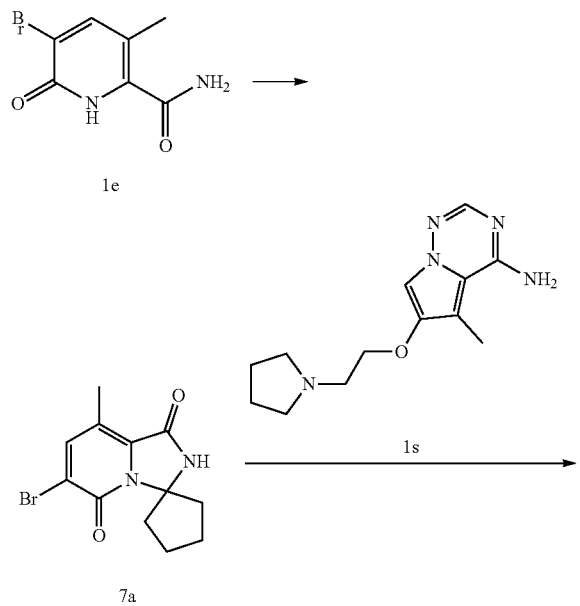

Step 1

Compound 1e (500 mg, 1.97 mmol) and cyclopentanone (664 mg, 7.89 mmol) were dissolved in anhydrous dioxane (6 mL), and concentrated sulfuric acid (98.7 mg, 0.986 mmol, purity: 98%) was added dropwise to the reaction liquid. The reaction liquid was stirred at 95° C. for 3 h. The reaction liquid was concentrated under reduced pressure to remove a part of dioxane (about 3 mL), and then filtered. n-Hexane (10 mL) was added to the collected filter cake, and the mixture was stirred at room temperature for 2 h and filtered. The cake was dried in vacuum for 2 h to give compound 7a.

MS-ESI, [M+H]$^+$, calculated: 297 and 299, found: 297 and 299. $^1$H NMR (400 MHz, DMSO-d$_6$) δ 10.16 (s, 1H), 8.02 (s, 1H), 2.71-2.78 (m, 2H), 2.37 (s, 3H), 1.91-1.93 (m, 2H), 1.79-1.84 (m, 2H), 1.63-1.67 (m, 2H).

Step 2

Reference was made to step 6 of Example 4 to give the hydrochloride of compound 7. MS-ESI, [M+H]$^+$, calculated: 478, found: 478. $^1$H NMR (400 MHz, D$_2$O) δ 7.68 (s, 1H), 7.49 (s, 1H), 7.00 (s, 1H), 4.02-4.01 (m, 2H), 3.70-3.69 (m, 2H), 3.57-3.56 (m, 2H), 3.28 (s, 3H), 3.18-3.17 (m, 2H), 2.58-2.57 (m, 2H), 2.14-2.13 (m, 3H), 2.00-1.93 (m, 5H), 1.84-1.79 (m, 4H), 1.69-1.66 (m, 1H).

Example 8

Compound 8

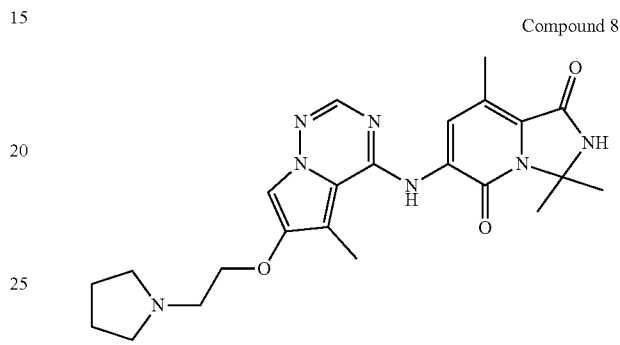

Synthetic Route:

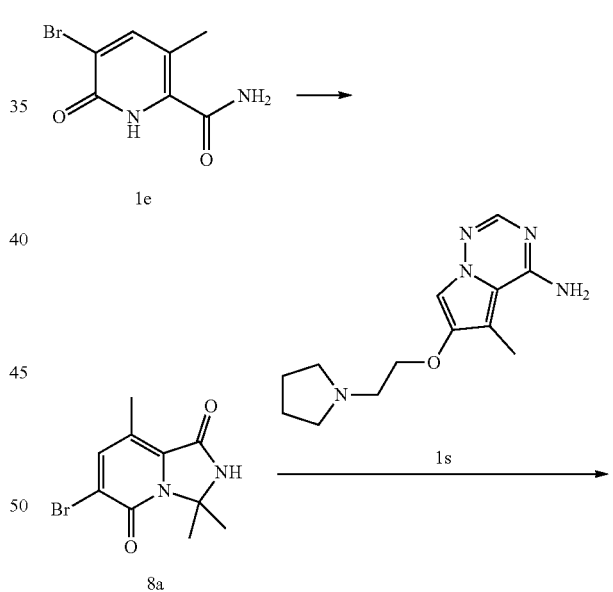

Step 1

Compound 1e (500 mg, 1.97 mmol) and acetone (458 mg, 7.89 mmol) were dissolved in anhydrous dioxane (6 mL), and concentrated sulfuric acid (96.7 mg, 0.966 mmol, purity: 98%) was added dropwise. The reaction liquid was stirred at 95° C. for 6 h. The reaction liquid was then concentrated under reduced pressure to remove dioxane (about 3 mL), and then filtered. The collected filter cake was washed with a mixed solution of petroleum ether/ethyl acetate (10/1, 8 mL×2) and then dried in vacuum for 2 h to give compound 8a. MS-ESI, [M+H]$^+$, calculated: 271 and 273, found: 271 and 273. $^1$H NMR (400 MHz, DMSO-d$_6$) δ 9.82 (s, 1H), 8.01 (s, 1H), 2.37 (s, 3H), 1.74 (s, 6H).

Step 2

Reference was made to step 6 of Example 4 to give the hydrochloride of compound 8. MS-ESI, [M+H]$^+$, calculated: 452, found: 452. $^1$H NMR (400 MHz, DMSO-d$_6$) δ 10.96 (s, 1H), 9.71 (s, 1H), 8.65 (s, 1H), 8.12 (s, 1H), 7.82 (s, 1H), 4.38-4.37 (m, 2H), 3.67-3.65 (m, 2H), 3.60-3.59 (m, 2H), 3.16-3.10 (m, 2H), 2.47-2.46 (m, 6H), 2.02-1.90 (m, 4H), 1.80-1.76 (m, 6H).

Example 9

Compound 9

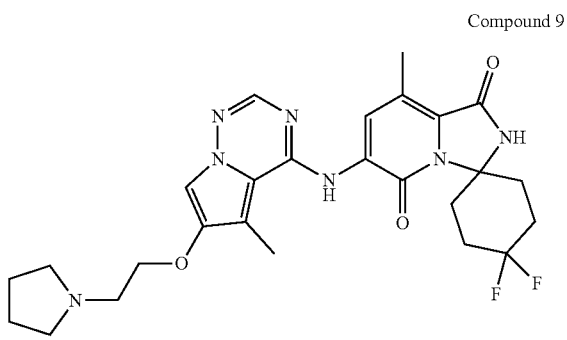 [SMILES: Cc1cc(Nc2ncnn3cc(OCCN4CCCC4)c(C)c23)c(=O)n2c1C(=O)NC21CCC(F)(F)CC1]

Synthetic Route:

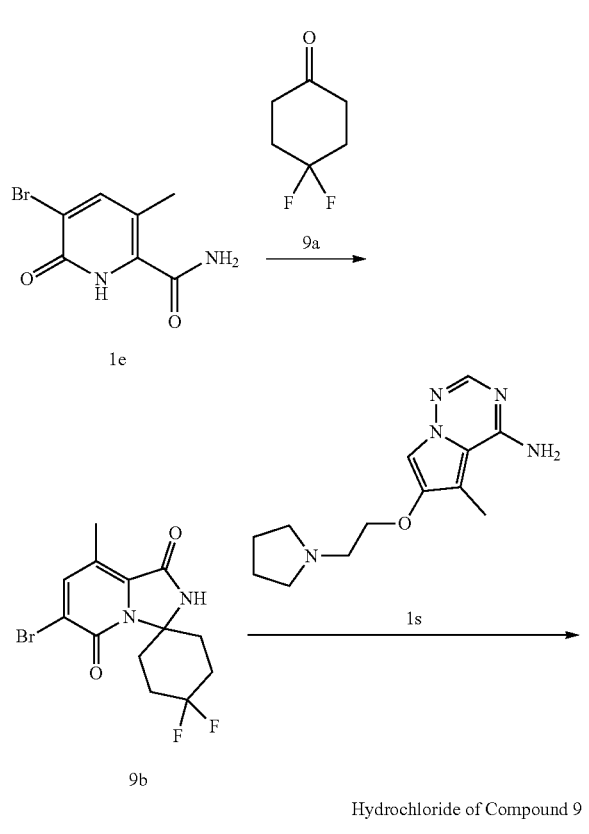

Step 1

Compound 1e (500 mg, 1.97 mmol) and compound 9a (1.06 g, 7.88 mmol) were dissolved in anhydrous dioxane (6 mL), and concentrated sulfuric acid (98.7 mg, 0.985 mmol, purity: 98%) was added dropwise to the reaction liquid. The reaction liquid was stirred at 95° C. for 1.5 h. The reaction liquid was concentrated under reduced pressure to remove a part of dioxane (about 3 mL), and then filtered. n-Hexane (12 mL) was added to the collected filter cake, and the mixture was stirred at room temperature for 2 h and filtered. The filter cake was dried in vacuum for 2 h to give compound 9b. MS-ESI, [M+H]$^+$, calculated: 347 and 349, found: 347 and 349. $^1$H NMR (400 MHz, DMSO-d$_6$) δ 10.57 (s, 1H), 8.05 (s, 1H), 3.17-3.25 (m, 2H), 2.39 (s, 3H), 2.14-2.27 (m, 4H), 1.61-1.64 (m, 2H).

Step 2

Reference was made to step 6 of Example 4 to give the hydrochloride of compound 9. MS-ESI, [M+H]$^+$, calculated: 528, found: 528. $^1$H NMR (400 MHz, DMSO-d$_6$) δ 10.91 (s, 1H), 10.46 (s, 1H), 8.68 (s, 1H), 8.13 (s, 1H), 7.83 (s, 1H), 4.38-4.37 (m, 2H), 3.60-3.59 (m, 4H), 3.27-3.10 (m, 4H), 2.43-2.41 (m, 6H), 2.18-2.16 (m, 4H), 2.07-2.02 (m, 2H), 1.90-1.88 (m, 2H), 1.69-1.66 (m, 2H).

Example 10

Compound 10

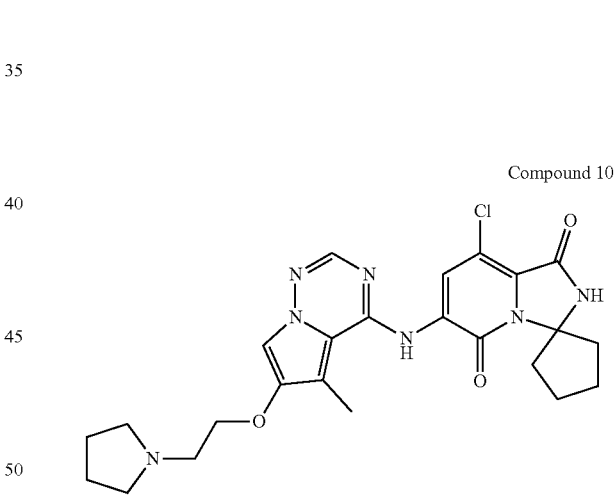

Synthetic Route:

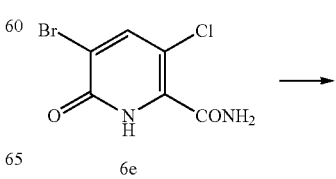

Example 11

Compound 11

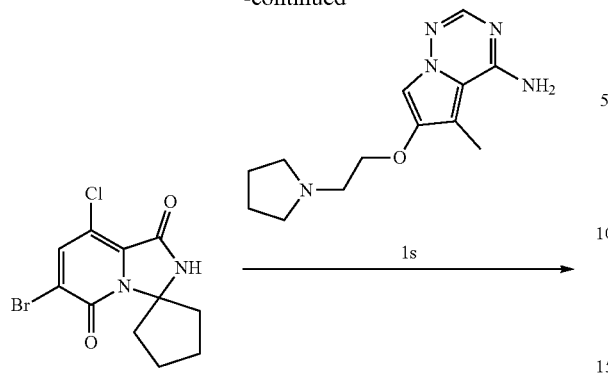

Hydrochloride of Compound 10

Step 1

Compound 6e (1.50 g, 4.71 mmol) and cyclopentanone (1.59 g, 18.9 mmol) were dissolved in dioxane (10 mL), and concentrated sulfuric acid (462 mg, 4.71 mmol) was added dropwise under stirring. The reaction liquid was stirred at 95° C. for 16 h. The reaction liquid was added with water (10 mL), and ethyl acetate (15 mL×4). The organic phases were combined, dried over anhydrous sodium sulfate, filtered and concentrated under reduced pressure. The residue was separated by column chromatography (1/1, petroleum ether/ethyl acetate, Rf=0.31) and purified to give compound 10a. MS-ESI, [M+H]$^+$, calculated: 317 and 319, found: 317 and 319.

Step 2

The trifluoroacetate of compound is (230 mg, 613 μmol) was dissolved in anhydrous dioxane (5 mL), and compound 10a (249 mg, 674 μmol), tris(dibenzylideneacetone)dipalladium (56.1 mg, 61.3 μmol), 4,5-bis(diphenylphosphino)-9,9-dimethylxanthene (70.9 mg, 123 μmol) and cesium carbonate (699 mg, 2.14 mmol) were added. The reaction liquid was purged with nitrogen three times and then stirred at 110° C. for 16 h. The reaction liquid was then directly concentrated under reduced pressure, and the residue was separated by column chromatography (10/1, dichloromethane/methanol, Rf=0.35) and purified, and concentrated to remove the eluent, and the resulting product was purified by high performance liquid chromatography (hydrochloric acid system) to give the hydrochloride of compound 10. MS-ESI, [M+H]$^+$, calculated: 498, found: 498. $^1$H NMR (400 MHz, DMSO-d$_6$) δ 10.68 (s, 1H), 10.26 (s, 1H), 8.79 (s, 1H), 8.17 (s, 1H), 7.86 (s, 1H), 4.38-4.36 (m, 2H), 3.61-3.60 (m, 4H), 3.13-3.11 (m, 2H), 2.83-2.78 (m, 2H), 2.52 (s, 3H), 2.03-1.83 (m, 8H), 1.75-1.74 (m, 2H).

Example 11

Compound 11

Synthetic Route:

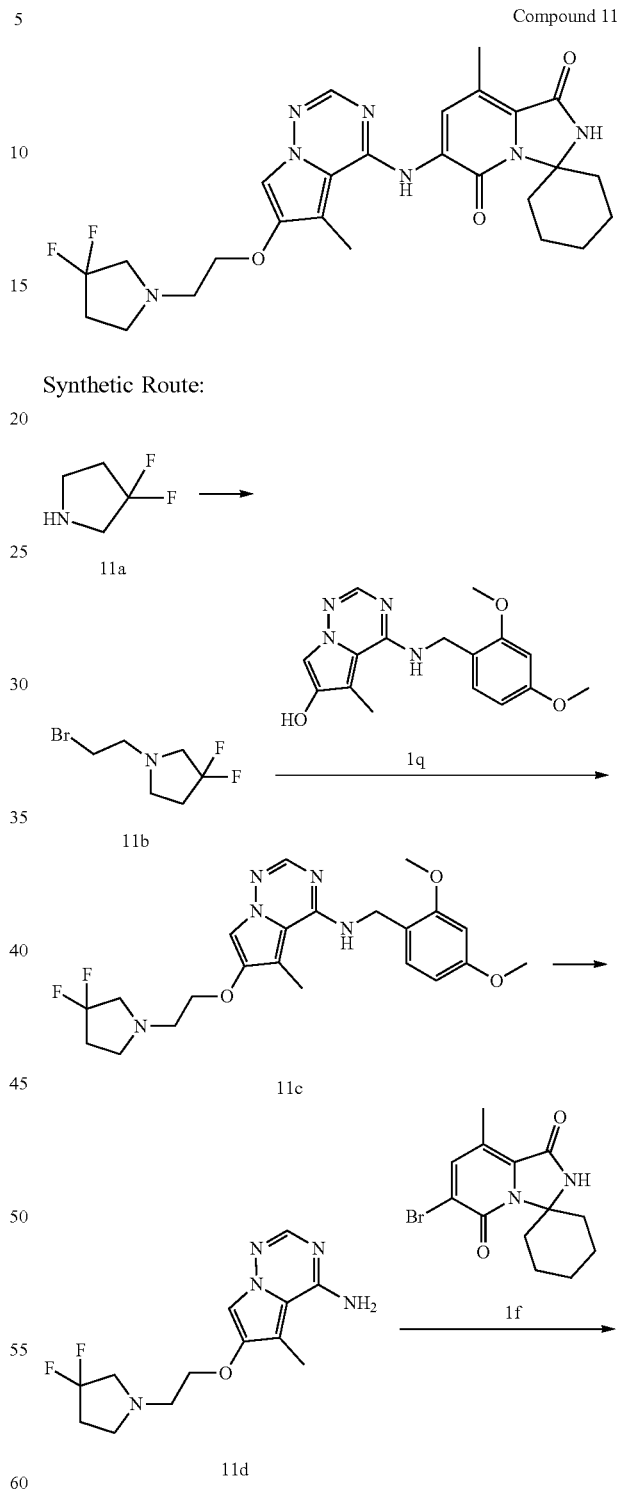

Step 1

The hydrochloride of compound 11a (500 mg, 3.48 mmol) was dissolved in 1,2-dibromoethane (5 mL), and N,N- diisopropylethylamine (900 mg, 6.97 mmol) was added. The reaction liquid was stirred at 25° C. for 14 h. After the reaction was completed, the reaction liquid was diluted with water (30 mL) and extracted with ethyl acetate (20 mL×4). The organic phase was dried over anhydrous sodium sulfate and filtered, and the filtrate was concentrated under reduced pressure. The residue was separated by column chromatography (3:1, petroleum ether/ethyl acetate, Rf=0.6) to give compound 11b. $^1$H NMR (400 MHz, CDCl$_3$) δ=3.41 (t, J=7.0 Hz, 2H), 2.99 (t, J=13.3 Hz, 2H), 2.92 (t, J=7.0 Hz, 2H), 2.83 (t, J=7.0 Hz, 2H), 2.29 (tt, J=7.1, 14.5 Hz, 2H).

Step 2

Compound 11b (250 mg, 795 μmol) was dissolved in N,N-dimethylformamide (4 mL), and then compound 1q (187 mg, 875 μmol) and sodium hydroxide (63.6 mg, 1.59 mmol) were added. The reaction liquid was stirred at 50° C. for 0.5 h. After the reaction was completed, the reaction liquid was added with water (50 mL) for dilution and then extracted with ethyl acetate (30 mL×3). The organic phases were combined, dried over anhydrous sodium sulfate and filtered, and the filtrate was concentrated under reduced pressure. The residue was separated by column chromatography (1:1, petroleum ether/ethyl acetate, Rf=0.1) to give compound 11c. MS-ESI, [M+H]$^+$, calculated: 448, found: 448.

Step 3

Compound 11c (300 mg, 670 μmol) was dissolved in trifluoroacetic acid (3.0 mL), and the reaction liquid was stirred at 100° C. for 1 h. After the reaction was completed, the reaction liquid was concentrated, and the residue was purified by high performance liquid chromatography (hydrochloric acid system) to give the hydrochloride of compound 11d.

MS-ESI, [M+H]$^+$, calculated: 298, found: 298.

Step 4

The hydrochloride of compound 11d (108 mg, 323 μmol) and compound 1f (111 mg, 356 μmol) were dissolved in anhydrous dioxane (2 mL), and then cesium carbonate (264 mg, 809 μmol) and methanesulfonato(2-dicyclohexylphosphino-3,6-dimethoxy-2,4,6-tri-isopropyl-1,1-biphenyl)(2-amino-1,1-biphenyl-2-yl)palladium(II) (29.3 mg, 32.4 μmol) were added. The reaction liquid was stirred at 105° C. for 12 h under nitrogen atmosphere. After the reaction was completed, the reaction liquid was concentrated under reduced pressure and separated by column chromatography (10:1, dichloromethane/methanol, Rf=0.3) to give a crude compound. Methanol (5 mL) was added to the crude product, and the mixture was stirred at 15° C. for 16 h and filtered. The filter cake was washed with methanol (2 mL×2) and dried to give compound 11.

MS-ESI, [M+H]$^+$, calculated: 528, found: 528. $^1$H NMR (400 MHz, DMSO-d$_6$) δ=10.21 (s, 1H), 8.91 (s, 1H), 8.66 (s, 1H), 8.09 (s, 1H), 7.72 (s, 1H), 4.09 (t, J=5.6 Hz, 2H), 3.06-2.92 (m, 4H), 2.89-2.77 (m, 4H), 2.49-2.46 (m, 6H), 2.31-2.18 (m, 2H), 1.82-1.72 (m, 2H), 1.71-1.59 (m, 3H), 1.54-1.42 (m, 2H), 1.35-1.20 (m, 1H).

Example 12

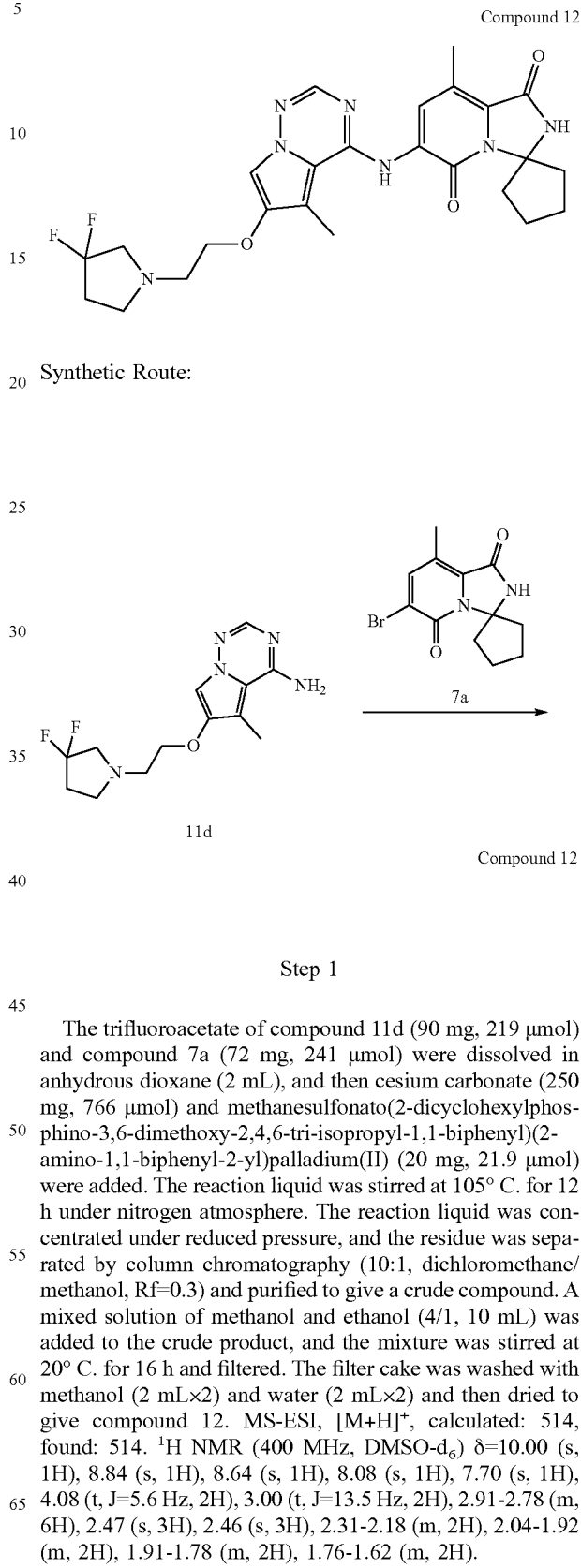

Compound 12

Synthetic Route:

Compound 12

Step 1

The trifluoroacetate of compound 11d (90 mg, 219 μmol) and compound 7a (72 mg, 241 μmol) were dissolved in anhydrous dioxane (2 mL), and then cesium carbonate (250 mg, 766 μmol) and methanesulfonato(2-dicyclohexylphosphino-3,6-dimethoxy-2,4,6-tri-isopropyl-1,1-biphenyl)(2-amino-1,1-biphenyl-2-yl)palladium(II) (20 mg, 21.9 μmol) were added. The reaction liquid was stirred at 105° C. for 12 h under nitrogen atmosphere. The reaction liquid was concentrated under reduced pressure, and the residue was separated by column chromatography (10:1, dichloromethane/methanol, Rf=0.3) and purified to give a crude compound. A mixed solution of methanol and ethanol (4/1, 10 mL) was added to the crude product, and the mixture was stirred at 20° C. for 16 h and filtered. The filter cake was washed with methanol (2 mL×2) and water (2 mL×2) and then dried to give compound 12. MS-ESI, [M+H]$^+$, calculated: 514, found: 514. $^1$H NMR (400 MHz, DMSO-d$_6$) δ=10.00 (s, 1H), 8.84 (s, 1H), 8.64 (s, 1H), 8.08 (s, 1H), 7.70 (s, 1H), 4.08 (t, J=5.6 Hz, 2H), 3.00 (t, J=13.5 Hz, 2H), 2.91-2.78 (m, 6H), 2.47 (s, 3H), 2.46 (s, 3H), 2.31-2.18 (m, 2H), 2.04-1.92 (m, 2H), 1.91-1.78 (m, 2H), 1.76-1.62 (m, 2H).

Example 13

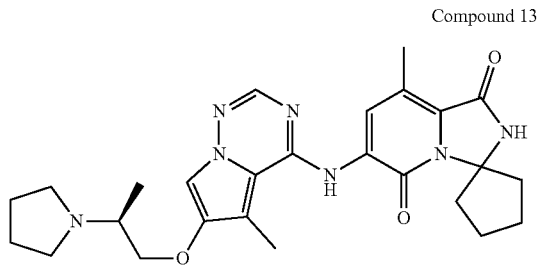 [SMILES: Cc1cc(Nc2ncnn3cc(OC[C@H](C)N4CCCC4)c(C)c23)c(=O)n2c1C(=O)NC21CCCC1]

Compound 13

Synthetic Route:

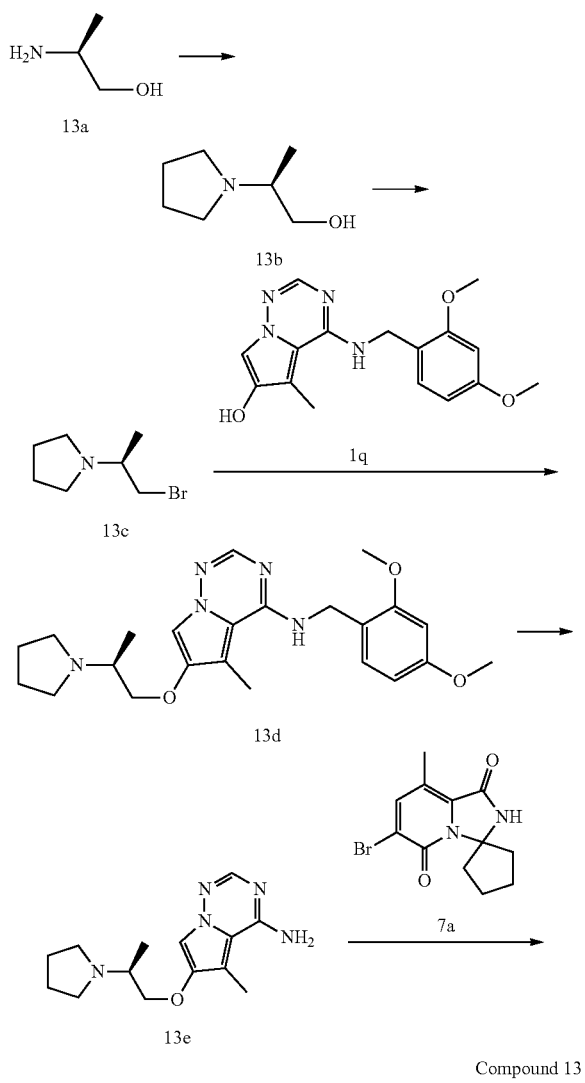

Step 1

Compound 13a (2.00 g, 26.6 mmol) and 1,4-dibromobutane (5.75 g, 26.6 mmol) were dissolved in acetonitrile (100 mL), and then potassium carbonate (7.36 g, 53.26 mmol) was added. The reaction liquid was stirred at 80° C. for 12 h. After the reaction was completed, the reaction liquid was filtered, and the filtrate was concentrated under reduced pressure. The residue was diluted with dichloromethane (250 mL) and washed with saturated aqueous potassium carbonate solution (75 mL×1). The organic phase was collected, and the aqueous phase was extracted with dichloromethane (75 mL×9). The organic phases were combined, dried over anhydrous sodium sulfate and filtered, and the filtrate was concentrated under reduced pressure to give product 13b in the form of a colorless oil.

MS-ESI, [M+H]$^+$, calculated: 130, found: 130. $^1$H NMR (400 MHz, CDCl$_3$) δ=3.61-3.55 (m, 1H), 3.40-3.34 (m, 1H), 2.99 (br s, 1H), 2.69-2.62 (m, 1H), 2.61-2.54 (m, 4H), 1.84-1.70 (m, 4H), 1.04 (d, J=6.5 Hz, 3H).

Step 2

Compound 13b (2.95 g, 23.1 mmol) was dissolved in dichloromethane (25 mL), and the reaction liquid was cooled to 0° C. Then triphenylphosphine (9.07 g, 34.6 mmol) and carbon tetrabromide (9.94 g, 30.0 mmol) were added at 0° C. The reaction liquid was stirred at 15° C. for 12 h. After the reaction was completed, the reaction liquid was diluted with water (150 mL) and extracted with dichloromethane (100 mL×3), and the organic phase was collected. The aqueous phase was adjusted to pH=9 with saturated aqueous sodium bicarbonate solution and extracted with ethyl acetate (100 mL×3). The organic phases were combined, dried over anhydrous sodium sulfate and filtered, and the filtrate was concentrated under reduced pressure to give product 13c in the form of a yellow oil. The crude product was used directly in the next step.

$^1$H NMR (400 MHz, CDCl$_3$) δ=2.84-2.77 (m, 1H), 2.65-2.59 (m, 1H), 2.58-2.52 (m, 1H), 2.51-2.48 (m, 2H), 2.51-2.46 (m, 1H), 1.76-1.71 (m, 3H), 1.74-1.71 (m, 2H), 1.66 (d, J=6.6 Hz, 3H).

Step 3

Compound 1q (200 mg, 636 μmol) was dissolved in N,N-dimethylformamide (4 mL), and then compound 13c (134 mg, 700 μmol) and sodium hydroxide (50.9 mg, 1.27 mmol) were added. The reaction liquid was stirred at 50° C. for 2 h. After the reaction was completed, the reaction liquid was concentrated under reduced pressure, and the residue was added with water (50 mL) for dilution and extracted with ethyl acetate (30 mL×3). The organic phases were combined, washed with saturated brine (40 mL×1), dried over anhydrous sodium sulfate and filtered, and the filtrate was concentrated under reduced pressure to give compound 13d in the form of a yellow solid. The crude product was used directly in the next step.

MS-ESI, [M+H]$^+$, calculated: 426, found: 426.

Step 4

Compound 13d (300 mg, 670 μmol) was dissolved in trifluoroacetic acid (10 mL), and the reaction liquid was stirred at 100° C. for 12 h. After the reaction was completed, the reaction liquid was concentrated, and the residue was purified by high performance liquid chromatography (hydrochloric acid system) to give the hydrochloride of compound 13e.

MS-ESI, [M+H]$^+$, calculated: 276, found: 276.

Step 5

The hydrochloride of compound 13e (76.0 mg, 244 μmol) and compound 7a (72.4 mg, 244 Pmol) were dissolved in anhydrous dioxane (3 mL), and then cesium carbonate (159 mg, 487 Pmol) and methanesulfonato(2-dicyclohexylphosphino-3,6-dimethoxy-2,4,6-tri-isopropyl-1,1-biphenyl)(2-amino-1,1-biphenyl-2-yl)palladium(II) (22.1 mg, 24.4 μmol) were added. The reaction liquid was stirred at 105° C. for 12 h under nitrogen atmosphere. After the reaction was completed, the reaction liquid was concentrated under reduced pressure, and the residue was added with water (50 mL) for dilution and extracted with ethyl acetate (30 mL×3). The organic phases were combined, washed with saturated brine (40 mL×1), dried over anhydrous sodium sulfate and filtered, and the filtrate was concentrated under reduced pressure. The residue was purified by high performance liquid chromatography (hydrochloric acid system) to give the hydrochloride of compound 13. The hydrochloride of 13 was dissolved in dichloromethane (30 mL) and washed successively with saturated aqueous sodium bicarbonate solution (20 mL) and saturated brine (20 mL). The organic phase was dried over anhydrous sodium sulfate and filtered, the filtrate was concentrated under reduced pressure. The residue was separated and purified by thin layer chromatography (10:1, dichloromethane/methanol, Rf=0.3) to give compound 13.

MS-ESI, [M+H]$^+$, calculated: 492, found: 492. $^1$H NMR (400 MHz, MeOH-d$_4$) δ=8.87-8.77 (m, 1H), 8.08-8.00 (m, 1H), 7.63-7.52 (m, 1H), 4.71-4.53 (m, 1H), 4.37-4.12 (m, 1H), 3.67-3.37 (m, 3H), 3.05-2.91 (m, 3H), 2.65-2.52 (m, 6H), 2.22-2.04 (m, 6H), 1.97-1.76 (m, 5H), 1.55-1.33 (m, 3H).

Example 14

Compound 14

Synthetic Route:

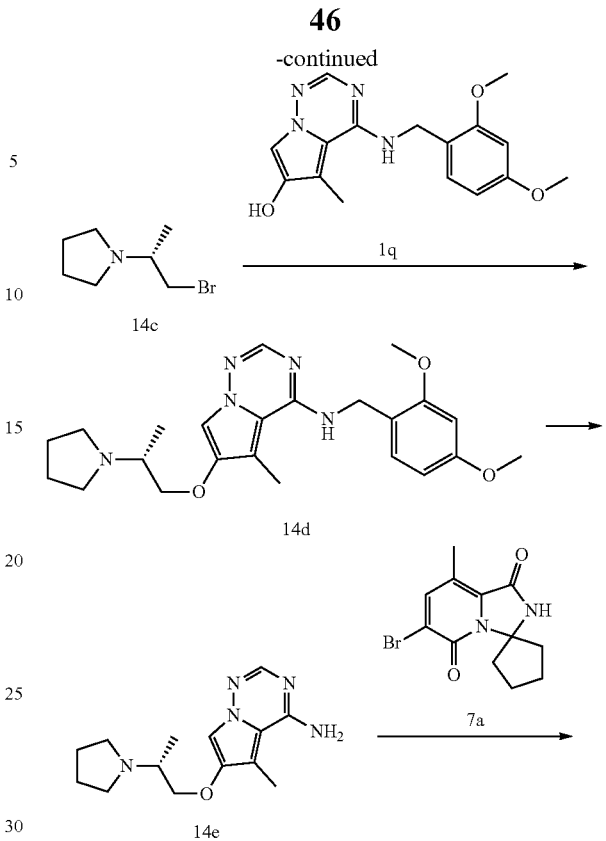

Step 1

Compound 14a (2.00 g, 26.6 mmol) and 1,4-dibromobutane (5.75 g, 26.6 mmol) were dissolved in acetonitrile (100 mL), and then potassium carbonate (7.36 g, 53.26 mmol) was added. The reaction liquid was stirred at 80° C. for 12 h. The reaction liquid was filtered, and the filtrate was concentrated under reduced pressure. The residue was diluted with dichloromethane (250 mL) and washed with saturated aqueous potassium carbonate solution (75 mL×1). The organic phase was collected, and the aqueous phase was extracted with dichloromethane (75 mL×9). The organic phases were combined, dried over anhydrous sodium sulfate and filtered, and the filtrate was concentrated under reduced pressure to give compound 14b.

MS-ESI, [M+H]$^+$, calculated: 130, found: 130. $^1$H NMR (400 MHz, CDCl$_3$) δ=3.63-3.58 (m, 1H), 3.41-3.35 (m, 1H), 2.90 (br s, 1H), 2.73-2.66 (m, 1H), 2.63-2.57 (m, 4H), 1.82-1.74 (m, 4H), 1.06 (d, J=6.5 Hz, 3H).

Step 2

Compound 14b (2.48 g, 19.2 mmol) was dissolved in dichloromethane (25 mL). The reaction liquid was cooled to 0° C., and then triphenylphosphine (7.55 g, 28.8 mmol) and tetrabromomethane (8.28 g, 25.0 mmol) were added at 0° C. The reaction liquid was stirred at 15° C. for 12 h. The reaction liquid was added with water (150 mL) for dilution and extracted with dichloromethane (100 mL×3), and the organic phase was collected. The aqueous phase was adjusted to pH=9 with saturated aqueous sodium bicarbonate solution and extracted with ethyl acetate (100 mL×3).

The organic phases were combined, dried over anhydrous sodium sulfate and filtered, and the filtrate was concentrated under reduced pressure to give compound 14c. The crude product was used directly in the next step.

Step 3

Compound 1q (250 mg, 795 μmol) was dissolved in N,N-dimethylformamide (3 mL), and then compound 14c (229 mg, 1.19 mmol) and sodium hydroxide (63.6 mg, 1.59 mmol) were added. The reaction liquid was stirred at 50° C. for 2 h. After the reaction was completed, the reaction liquid was concentrated under reduced pressure. The residue was diluted with water (30 mL), adjusted to pH=3 with 1 M aqueous hydrochloric acid solution, and then washed with dichloromethane (50 mL×3). The mixture was adjusted to pH=11 with 1 M aqueous sodium hydroxide solution and extracted with dichloromethane (60 mL×3). The organic phases were combined, washed with saturated brine (150 mL×1), dried over anhydrous sodium sulfate and filtered, and the filtrate was concentrated under reduced pressure to give compound 14d. The crude product was used directly in the next step.

MS-ESI, [M+H]+, calculated: 426, found: 426.

Step 4

Compound 14d (430 mg, 1.01 mmol) was dissolved in trifluoroacetic acid (15 mL), and the reaction liquid was stirred at 100° C. for 3 h. After the reaction was completed, the reaction liquid was concentrated, and the residue was purified by high performance liquid chromatography (hydrochloric acid system) to give the hydrochloride of compound 14e.

MS-ESI, [M+H]+, calculated: 276, found: 276.

Step 5

The hydrochloride of compound 14e (80.0 mg, 206 μmol) and compound 7a (61.2 mg, 206 Pmol) were dissolved in anhydrous dioxane (6 mL), and then cesium carbonate (168 mg, 515 Pmol) and methanesulfonato(2-dicyclohexylphosphino-3,6-dimethoxy-2,4,6-tri-isopropyl-1,1-biphenyl)(2-amino-1,1-biphenyl-2-yl)palladium(II) (18.7 mg, 20.6 μmol) were added. The reaction liquid was stirred at 95° C. for 12 h under nitrogen atmosphere. After the reaction was completed, the reaction liquid was concentrated under reduced pressure, and the residue was separated and purified by column chromatography (10:1, dichloromethane/methanol, Rf=0.25) to give a crude product. The crude product was purified by high performance liquid chromatography (hydrochloric acid system) to give the hydrochloride of compound 14.

MS-ESI, [M+H]+, calculated: 492, found: 492. 1H NMR (400 MHz, DMSO-$d_6$) δ=7.76-7.68 (m, 1H), 7.53-7.45 (m, 1H), 7.05-6.98 (m, 1H), 4.12-4.02 (m, 1H), 3.98-3.88 (m, 1H), 3.77-3.59 (m, 3H), 3.31-3.21 (m, 2H), 2.68-2.53 (m, 2H), 2.20-2.08 (m, 5H), 2.06-1.93 (m, 4H), 1.89-1.77 (m, 5H), 1.73-1.62 (m, 2H), 1.53-1.47 (m, 3H).

Example 15

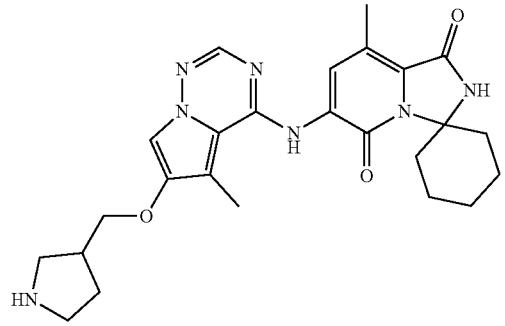

Compound 15

Synthetic Route:

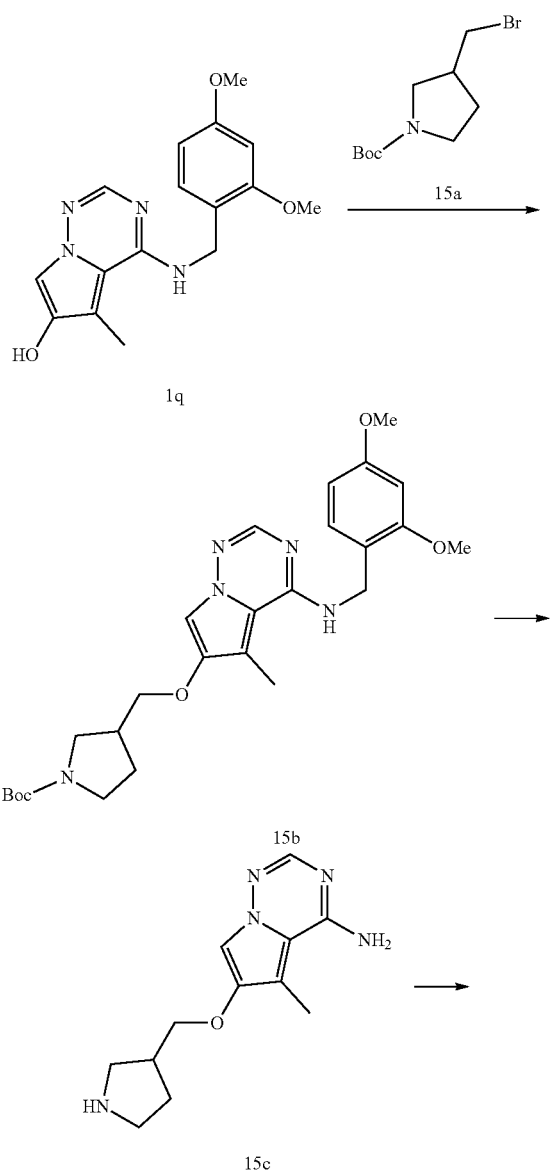

-continued

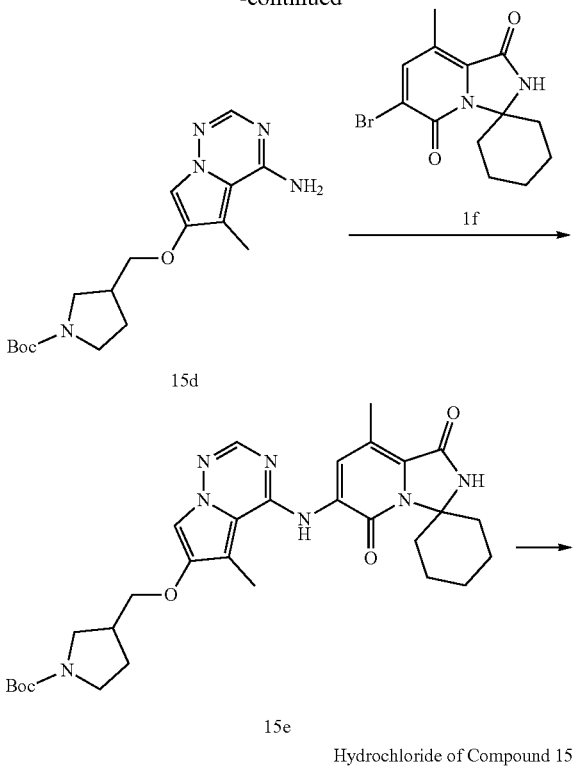

15d

15e

Hydrochloride of Compound 15

Step 1

Compound 1q (357 mg, 1.14 mmol) and compound 15a (300 mg, 1.14 mmol) were dissolved in N,N-dimethylformamide (3 mL), and sodium hydroxide (136 mg, 3.41 mmol) was added to the reaction liquid. The reaction liquid was stirred at 50° C. for 0.5 h. The reaction liquid was diluted with water (60 mL) and extracted with ethyl acetate (60 mL×3). The organic phases were combined, washed with water (200 mL×1) and saturated brine (200 mL×1), dried over anhydrous sodium sulfate and filtered, and the filtrate was concentrated under reduced pressure. The crude product was separated by column chromatography (2/1, petroleum ether/ethyl acetate, Rf=0.45) to give compound 15b. MS-ESI, [M+H]$^+$, calculated: 498, found: 498.

Step 2

Compound 15b (255 mg, 0.509 mmol) was dissolved in trifluoroacetic acid (20 mL). The reaction liquid was stirred at 100° C. for 2 h under nitrogen atmosphere. The reaction liquid was concentrated under reduced pressure to give the trifluoroacetate of compound 15c. MS-ESI, [M+H]$^+$, calculated: 248, found: 248.

Step 3

The trifluoroacetate of compound 15c (200 mg, 0.554 mmol) was dissolved in tetrahydrofuran (3 mL) and methanol (3 mL), and di-tert-butyl dicarbonate (121 mg, 0.554 mmol) and triethylamine (224 mg, 2.21 mmol) were added to the reaction liquid. The reaction liquid was stirred at 25° C. for 1 h. The reaction liquid was diluted with water (60 mL) and extracted with dichloromethane (60 mL×4). The organic phases were combined, washed successively with water (200 mL×1) and saturated brine (200 mL×1), dried over anhydrous sodium sulfate and filtered, and the filtrate was concentrated under reduced pressure. The crude product was purified by high performance liquid chromatography (neutral condition) to give compound 15d. MS-ESI, [M+H]$^+$, calculated: 348, found: 348.

Step 4

Compounds 15d (40 mg, 0.115 mmol) and 1f (40.5 mg, 0.125 mmol) were dissolved in anhydrous dioxane (3 mL), and cesium carbonate (102 mg, 0.313 mmol) and methanesulfonato(2-dicyclohexylphosphino-3,6-dimethoxy-2,4,6-tri-isopropyl-1,1-biphenyl)(2-amino-1,1-biphenyl-2-yl)palladium(II) (9.45 mg, 10.4 µmol) were added to the reaction liquid under nitrogen atmosphere. The reaction liquid was stirred at 100° C. for 12 h. The reaction liquid was then concentrated, and the crude product was separated by column chromatography (20:1, dichloromethane/methanol, Rf=0.35) to give compound 15e.

MS-ESI, [M+H]$^+$, calculated: 578, found: 578.

Step 5

Compound 15e (68.0 mg, 0.113 mmol) was dissolved in absolute methanol (3 mL), and a solution of hydrochloric acid in methanol (4.23 mL, 4 M, 16.9 mmol) was added. The reaction liquid was stirred at 25° C. for 1 h. The reaction liquid was concentrated, and the residue was stirred in methanol (30 mL) for 1 h, filtered and washed with methanol (10 mL×2). The filter cake was stirred in methanol (30 mL) for 1 h, filtered and washed with methanol (10 mL×2). The filter cake was collected and dried under reduced pressure to give the hydrochloride of compound 15.

MS-ESI, [M+H]$^+$, calculated: 478, found: 478. $^1$H NMR (400 MHz, DMSO-d$_6$) δ 10.22 (s, 1H), 8.99 (br s, 2H), 8.90 (s, 1H), 8.66 (s, 1H), 8.10 (s, 1H), 7.72 (s, 1H), 4.09-3.96 (m, 2H), 3.23-3.12 (m, 2H), 3.07-2.92 (m, 3H), 2.81-2.71 (m, 1H), 2.53-2.51 (m, 6H), 2.17-2.05 (m, 1H), 1.82-1.58 (m, 7H), 1.54-1.45 (m, 2H), 1.34-1.21 (m, 1H).

Example 16

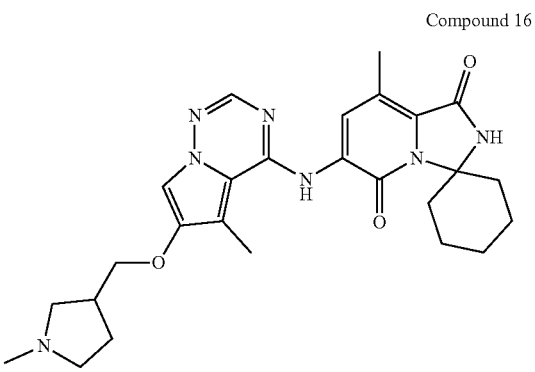 [SMILES: Cc1cc(Nc2ncnn3cc(OCC4CCN(C)C4)c(C)c23)c(=O)n2c1C(=O)NC21CCCCC1]

Compound 16

Synthetic Route:

Hydrochloride of Compound 15→Hydrochloride of Compound 16

The hydrochloride of compound 15 (30 mg, 0.049 mmol) was dissolved in absolute methanol (3 mL), and aqueous formaldehyde solution (6.39 mg, 78.7 μmol, purity: 37%) and sodium cyanoborohydride (6.60 mg, 0.105 mmol) were added. The reaction liquid was stirred at 10° C. for 1 h. Water (20 mL) was added to the reaction liquid to quench the reaction, and then the reaction liquid was concentrated under reduced pressure to remove methanol, filtered and washed with methanol (3 mL×2). The crude product was purified by high performance liquid chromatography (hydrochloric acid system) to give the hydrochloride of compound 16. MS-ESI, [M+H]$^+$, calculated: 492, found: 492. $^1$H NMR (400 MHz, DMSO-d$_6$) δ 10.65-10.43 (m, 1H), 10.22 (s, 1H), 8.91 (s, 1H), 8.66 (s, 1H), 8.10 (s, 1H), 7.76-7.70 (m, 1H), 4.14-3.99 (m, 2H), 3.79-3.42 (m, 2H), 3.16-2.92 (m, 4H), 2.86-2.81 (m, 3H), 2.53-2.51 (m, 6H), 2.30-1.84 (m, 2H), 1.81-1.58 (m, 6H), 1.53-1.42 (m, 2H), 1.34-1.22 (m, 1H).

In Vitro Activity Assays

1. In Vitro Evaluation of Inhibitory Activity of Compounds Disclosed Herein Against MNK2 Protein Kinase Purpose of experiment: to test the inhibitory activity of the compounds against MNK2 protein kinase Experimental materials: assay buffer: 8 mM 3-(N-morpholino)propanesulfonic acid, 0.2 mM disodium ethylenediaminetetraacetate, 0.01% polyoxyethylene lauryl ether, 5% glycerol, 0.1% β-mercaptoethanol and 1 mg of bovine serum albumin Experimental operation: Mnk2 protein kinase inhibitory activity assays were performed using the KinaseProfiler™ service from Eurofins Pharma Discovery Services UK Limited. Serially diluted DMSO solutions containing the compounds to be tested (3-fold serial dilution, starting from 10 μM), MNK2 (h) protein kinase and 0.33 mg/mL myelin basic protein were added to a freshly prepared buffer (pH 7.0), and then stirred homogeneously. The reaction was initiated by adding a mixture of $^{33}$P-ATP (intensity of radioactivity: 10 μCi/μL) and 10 mM magnesium acetate. After the resulting mixture was reacted at room temperature for 40 min, the reaction was terminated by adding phosphoric acid to dilute to a concentration of 0.5%. 10 μL of the reaction solution was filtered using a P30 filtermat, and then the filtermat was washed four times with 0.425% phosphoric acid for 4 min each, followed by washing once with methanol. After drying, the intensity of radioactivity was determined using the Filter-Binding method.

The protein kinase inhibitory activity of the compounds was expressed as a percentage of the residual protein kinase activity relative to the blank substrate (DMSO alone). The Prism4 software package (GraphPad) was used to calculate IC$_{50}$ values and fit curves.

TABLE 1

Inhibitory activity (IC$_{50}$) of compounds of examples disclosed herein against MNK2 protein kinase

| Compound No. | IC$_{50}$ (nM) against MNK2 |
|---|---|
| Compound 1 (hydrochloride) | 22 |
| Compound 2 (hydrochloride) | 63 |
| Compound 3 (hydrochloride) | 39 |
| Compound 4 (hydrochloride) | 25 |
| Compound 5 (hydrochloride) | 26 |
| Compound 6 (hydrochloride) | 21 |
| Compound 7 (hydrochloride) | 17 |
| Compound 8 (hydrochloride) | 33 |
| Compound 9 (hydrochloride) | 30 |
| Compound 10 (hydrochloride) | 8 |
| Compound 11 | 28 |
| Compound 12 | 17 |
| Compound 13 | 14 |
| Compound 15 (hydrochloride) | 28 |
| Compound 16 (hydrochloride) | 27 |

Experimental conclusion: the compounds disclosed herein all show excellent inhibitory activity against MNK2 protein kinase.

2. In Vitro Evaluation of Inhibitory Activity of Compound Disclosed Herein Against MNK1 Protein Kinase Purpose of experiment: to test the inhibitory activity of the compound against MNK1 protein kinase Experimental materials: assay buffer: 20 mM 4-hydroxyethylpiperazine ethanesulfonic acid (pH 7.5), 10 mM magnesium chloride, 1 mM ethylene glycol-bis-(2-aminoethylether)-N,N,N',N'-tetraacetic acid, 0.02% polyoxyethylene lauryl ether, 0.02 mg/mL bovine serum albumin, 0.1 mM sodium vanadate, 2 mM dithiothreitol, and 1% DMSO.

Experimental operation: Mnk1 protein kinase inhibitory activity assays were performed using the Kinase HotSpot Profiling service from Reaction Biology Corp. The substrate was added to a freshly prepared buffer, followed by addition of MNK1 (h). The mixture was stirred homogeneously. Serially diluted DMSO solution containing the compounds to be tested (3-fold serial dilution, starting from 3 μM) was added by using Echo550, and then $^{33}$P-ATP (final intensity of radioactivity: 0.01 μCi/μl) was added to initiate the reaction. The mixture was pre-incubated at room temperature for 120 min. The resulting reaction solution was filtered using P81 ion exchange paper (Whatman #3698-915), which was then washed with 0.75% phosphoric acid. The concentration of the radioactive phosphorylated substrate remaining on the filter paper was measured.

The protein kinase inhibitory activity of the compound was expressed as a percentage of the residual protein kinase activity relative to the blank substrate (DMSO alone). The Prism4 software package (GraphPad) was used to calculate the IC$_{50}$ value and fit the curve.

TABLE 2

Inhibitory activity (IC$_{50}$) of compound of example disclosed herein against MNK1 protein kinase

| Compound No. | IC$_{50}$ (nM) against MNK1 |
|---|---|
| Compound 1 (hydrochloride) | 54.65 |

Experimental conclusion: the compound disclosed herein shows excellent inhibitory activity against MNK1 protein kinase.

3. In Vitro Evaluation of Inhibitory Activity of Compounds Disclosed Herein Against eIF4E Phosphorylation Purpose of experiment: to test the inhibition (IC$_{50}$) of the compounds against eIF4E phosphorylation of HCT116 cell strain.

Experimental materials: HCT116 cells (ATCC), RPM11640 medium (Life technology), fetal bovine serum (Hyclone), double antibodies (penicillin, streptomycin) (Millipore), phosphate buffer (Corning), 384-well cell plate (PerkinElmer), and AlphaLISA® SureFire® Ultra™ p-eIF4E (Ser209) Assay Kit (PerkinElmer).

Experimental operation: HCT116 cells were digested to make a cell suspension, which was then plated in a 96-well plate. The cell plate was then placed in an incubator for overnight incubation. Compounds were diluted to corresponding concentrations and added to the cell plate, and the resulting mixture was incubated for 3 h. The cells were subsequently lysed with a lysis buffer, and the lysate was transferred to a 384-well plate. A mixed receptor was freshly prepared according to the kit instructions and added to the 384-well plate, and the mixture was incubated at room temperature for 1 h. Then a mixed donor was freshly prepared according to the kit instructions and added to the 384-well plate, and the resulting mixture was incubated at room temperature for 1 h.

The signals were read on EnVision using the standard AlphaLISA program, curves were fitted using Graphpad prism, and the $IC_{50}$ values were calculated.

TABLE 3

Inhibitory activity ($IC_{50}$) of compounds of examples disclosed herein against eIF4E phosphorylation

| Compound No. | $IC_{50}$ for p-eIF4E of HCT116 cell strain (nM) |
| --- | --- |
| Compound 1 (hydrochloride) | 3.46 |
| Compound 4 (hydrochloride) | 14 |
| Compound 5 (hydrochloride) | 9.5 |
| Compound 6 (hydrochloride) | 0.66 |
| Compound 7 (hydrochloride) | 6.5 |
| Compound 8 (hydrochloride) | 24 |
| Compound 9 (hydrochloride) | 12 |
| Compound 10 (hydrochloride) | 3.1 |
| Compound 11 | 18.9 |
| Compound 12 | 8.6 |
| Compound 13 | 10.5 |
| Compound 16 (hydrochloride) | 2.8 |

Experimental conclusion: the compounds disclosed herein all show excellent inhibitory activity against eIF4E phosphorylation.

4. Pharmacokinetic Evaluation of Compounds Disclosed Herein

Purpose of experiment: to test pharmacokinetic parameters of the compounds in CD-1 mice Experimental materials: CD-1 mice (Male, 7-9 weeks age, Shanghai Sippe-Bk Lab Animal Co., Ltd.)

Experimental operation: pharmacokinetic characteristics of the compounds after intravenous injection and oral administration for the rodent were tested by a standard scheme, and the candidate compounds were each formulated into a clear solution or a uniform suspension in the experiments and intravenously administered and intragastrically administered once to a mouse. The vehicle for the intravenous injection and oral administration was 1000 hydroxypropyl-β-cyclodextrin aqueous solution or normal saline solution. Four male C57BL/6 mice were used for the project. Two mice were subjected to intravenous injection at a dose of 0.5 mg/kg, and plasma samples were collected at 0 h (before administration) and 0.083, 0.25, 0.5, 1, 2, 4, 8, 12 and 24 h (after administration); the other two mice were subjected to intragastric administration at a dose of 2 mg/kg, and plasma samples were collected at 0 h (before administration) and 0.25, 0.5, 1, 2, 4, 8, 12 and 24 h (after administration). Whole blood samples within 24 h were collected and each centrifuged at 3000 g for 10 min. The supernatant was separated to obtain plasma sample, and acetonitrile solution containing internal standard whose volume is 420 times that of the plasma sample was added to precipitate the protein. The mixture was vortexed at 800 rpm for 10 min, and then 1 μL of supernatant was taken for injection. Plasma concentrations were quantitatively analyzed by LC-MS/MS method, and pharmacokinetic parameters, such as peak concentration ($C_{max}$), clearance (CL), half-life ($T_{1/2}$), tissue distribution (Vdss), area under the plasma drug concentration-time curve ($AUC_{0-last}$) and bioavailability (F), were calculated.

TABLE 4

Pharmacokinetic results of compounds of examples disclosed herein in mice

| Compound No. | Peak concentration $C_{max}$ (nM) | Clearance CL (mL/min/kg) | Tissue distribution Vdss (L/kg) | Half-life $T_{1/2}$ (PO, h) | Area under the plasma drug concentration-time curve $AUC_{0-last}$ PO (nM · hr) | Bioavailability F (%) |
| --- | --- | --- | --- | --- | --- | --- |
| Compound 1 (hydrochloride) | 35.9 | 33.3 | 14.1 | ND | 956 | 32.5 |
| Compound 7 (hydrochloride) | 131 | — | — | 3.2 | 1386 | — |
| Compound 11 | 104 | 21.8 | 2.53 | 12.1 | 405 | 14.2 |

ND: undetermined (correlation parameters cannot be calculated since the elimination phase cannot be determined);
—: not detected.

Experimental conclusion: the compounds disclosed herein show relatively good absorption in CD-1 mice.

5. In Vivo Efficacy Experiment of Compound Disclosed Herein for CT-26 Mouse Graft Tumor Purpose of experiment: to determine in vivo efficacy of compound for CT-26 mouse graft tumor Experimental materials: CT-26 cells, RMPI-1640 medium containing 10% fetal bovine serum, and mice (female, Shanghai Sippe-Bk Lab Animal Co., Ltd.)

Experimental operation: CT-26 cells were cultured in RMPI-1640 medium containing 10% fetal bovine serum in an incubator at 37° C./5% $CO_2$. Tumor cells were subcultured, and after an appropriate concentration was reached and the tumor cells were in the logarithmic growth phase, the tumor cells were collected, counted and then resuspended in DPBS (phosphate buffered solution), and the concentration of the cell suspension was adjusted to $3×10^6$/mL for inoculation.

Establishment of mouse colon cancer graft tumor: cells were collected and adjusted to a concentration of $3×10^6$ cells/mL (resuspended in DPBS to obtain cell suspension), and 0.1 mL of tumor cells was injected subcutaneously at the right dorsal side of the mice under sterile conditions, and $3×10^5$ cells were inoculated for each mouse. After the tumor grew to a certain size, the length (a) and the width (b) of the tumor was measured by using a digital vernier caliper, and the tumor volume (TV) was calculated, wherein the calculation formula is as follows: $TV=a×b^2/2$.

CT-26 tumor cell inoculation: on the day of inoculation, animals were grouped (8 animals for each) according to the body weight and subjected to drug administration separately, and the day of inoculation was considered as D0. When the tumor size reached about 60 $mm^3$, the animals in the antibody groups were grouped according to the tumor size and the body weight. The body weight and tumor size of the animals were measured three times a week during the experiment, while clinical symptoms of the animals were observed and recorded daily, and for each administration, reference was made to the animal body weight measured most recently. The inhibitory effect of the compound on colon cancer graft tumor in mice was determined after 21-day treatment at a dose of 30 mg/Kg QD (once daily), 90 mg/Kg QD (once daily) and 200 mg/Kg QD (once daily), and the specific information is shown in Table 5 below.

The evaluation index of the anti-tumor activity is relative tumor proliferation rate T/C (%); if T/C>40%, it suggests the drug is ineffective, and if T/C (%)≤40% and P<0.05 after statistical treatment, the drug is considered to be effective. The calculation formula of T/C (%) is as follows: T/C (%)=($T_{RTV}/C_{RTV}$)×100%. $T_{RTV}$ is the relative tumor volume of the treatment group, and $C_{RTV}$ is the relative tumor volume of the negative control group; TGI (%)$^a$=(1−average tumor volume at the end of administration of a treatment group/average tumor volume at the end of treatment of the vehicle control group)×100%.

TABLE 5

In vivo anti-tumor efficacy of compound of example disclosed herein in CT-26 graft tumor model

| Compound | Administration dose | TGI % | T/C % |
| --- | --- | --- | --- |
| Compound 12 | 30 mg/Kg, QD | 63.57 | 36.43 |
| Compound 12 | 90 mg/Kg, QD | 68.89 | 31.11 |
| Compound 12 | 200 mg/Kg, QD | 68.51 | 33.31 |

Experimental conclusion: the compound disclosed herein has significant effect in inhibiting colon cancer graft tumor in mice.

The invention claimed is:

1. A compound of formula (I) or a pharmaceutically acceptable salt thereof,

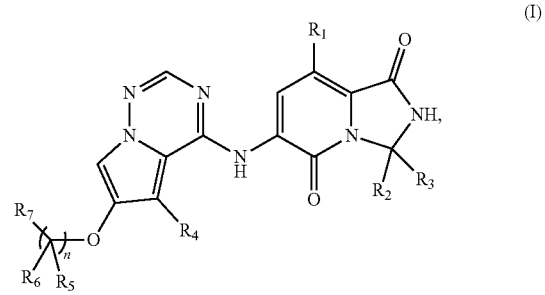

wherein: $R_1$ is H, F, Cl, Br or $C_{1-3}$ alkyl;

$R_2$ and $R_3$ are each independently H or $C_{1-3}$ alkyl, wherein the $C_{1-3}$ alkyl is optionally substituted with 1, 2 or 3 substituents independently selected from F, Cl, Br and I;

or $R_2$ and $R_3$, together with the carbon atom attached thereto, form cyclopentyl, cyclohexyl or piperidinyl, wherein the cyclopentyl, cyclohexyl and piperidinyl are optionally substituted with 1, 2 or 3 $R_a$;

each $R_a$ is independently H, F, Cl, Br or $C_{1-3}$ alkyl;

$R_4$ is H, F, Cl, Br or $C_{1-3}$ alkyl;

$R_5$ and $R_6$ are each independently H, F, Cl, Br, I or $C_{1-3}$ alkyl;

$R_7$ is pyrrolidinyl, wherein the pyrrolidinyl is optionally substituted with 1, 2 or 3 $R_b$;

each $R_b$ is independently H, F, Cl, Br, I or $C_{1-3}$ alkyl, wherein the $C_{1-3}$ alkyl is optionally substituted with 1, 2 or 3 substituents independently selected from F, Cl, Br and I;

n is 1 or 2.

2. The compound or the pharmaceutically acceptable salt thereof according to claim 1, wherein each $R_a$ is independently H, F, Cl, Br, —$CH_3$ or —$CH_2CH_3$.

3. The compound or the pharmaceutically acceptable salt thereof according to claim 1, wherein $R_2$ and $R_3$ are each independently H, —$CH_3$ or —$CH_2CH_3$.

4. The compound or the pharmaceutically acceptable salt thereof according to claim 1, wherein $R_2$ and $R_3$, together with a carbon atom attached thereto, form

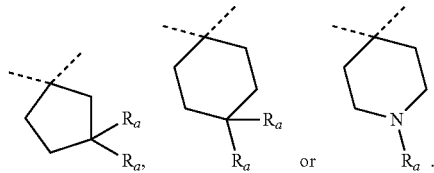

5. The compound or the pharmaceutically acceptable salt thereof according to claim 4, wherein $R_2$ and $R_3$, together with the carbon atom attached thereto, form

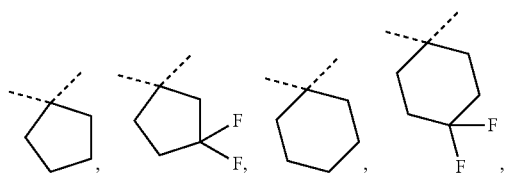

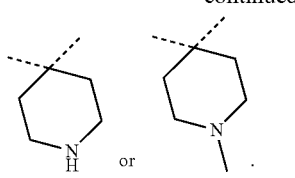 or
6. The compound or the pharmaceutically acceptable salt thereof according to claim 1, wherein the structural unit
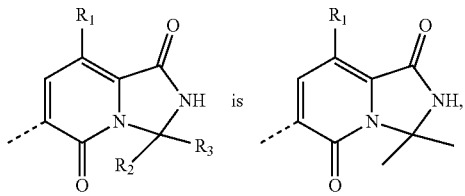 is
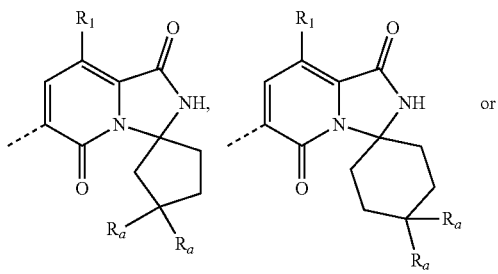 or
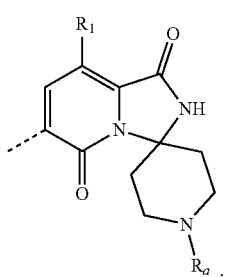.
7. The compound or the pharmaceutically acceptable salt thereof according to claim 6, wherein the structural unit
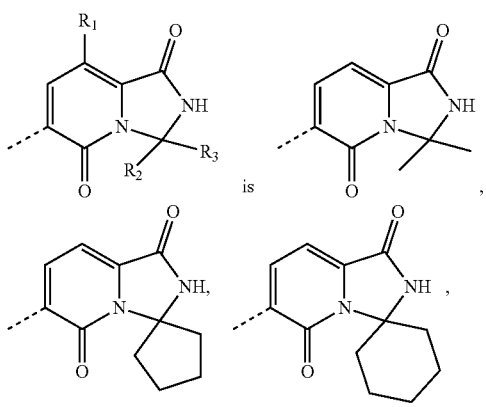
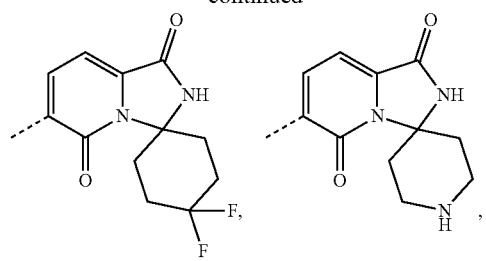
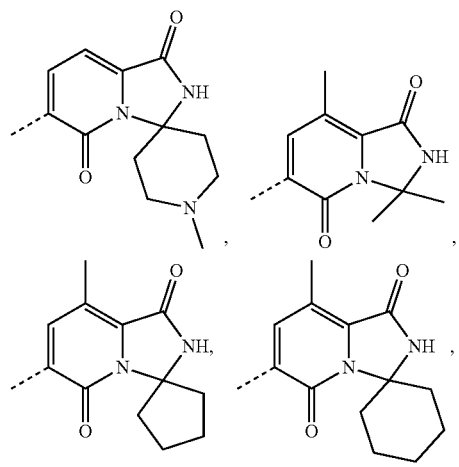
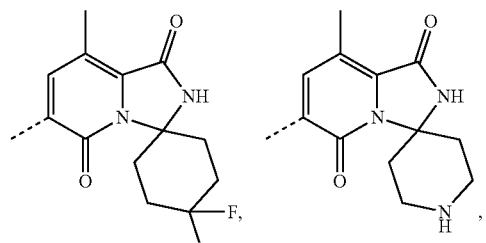
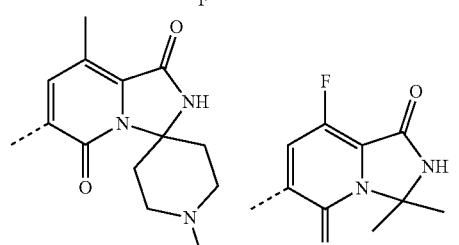
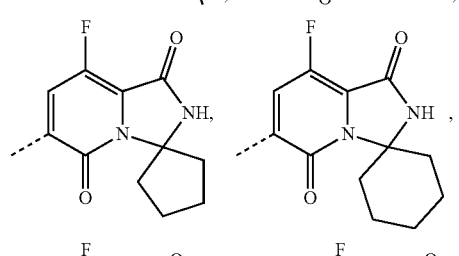
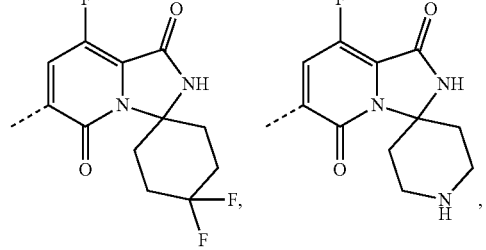

-continued

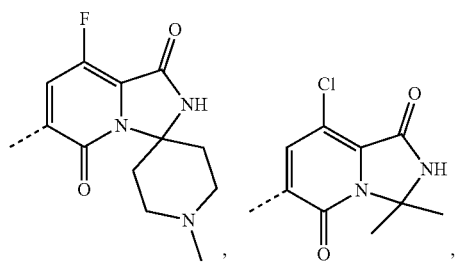

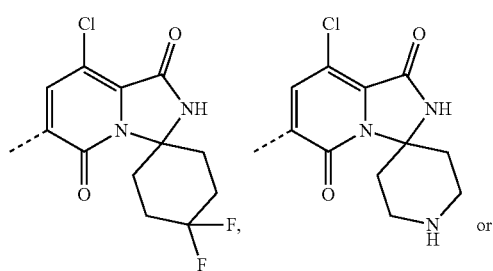

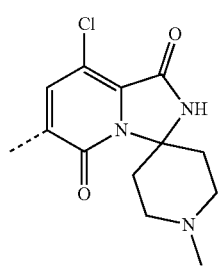

8. The compound or the pharmaceutically acceptable salt thereof according to claim 1, wherein the compound has a structure shown as any one of structural formulas (I-1) to (I-4):

(I-1)

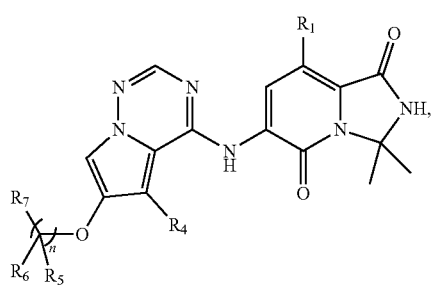

-continued (I-2)

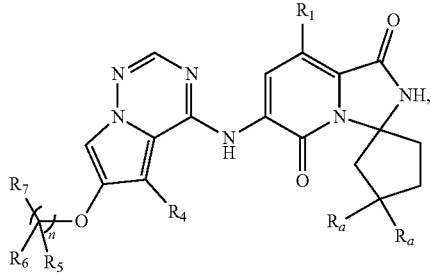

(I-3)

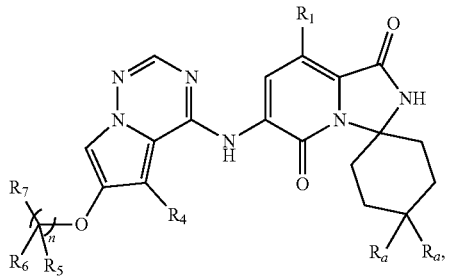

(I-4)

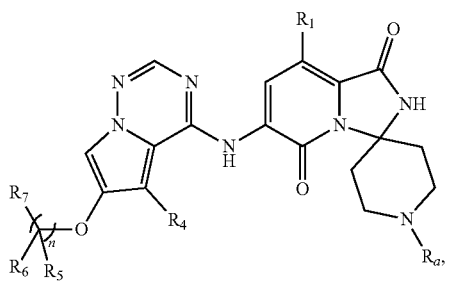

wherein $R_1$, $R_4$, $R_5$, $R_6$, $R_7$, $R_a$ and n are as defined in claim 1.

9. The compound or the pharmaceutically acceptable salt thereof according to claim 1, wherein each $R_b$ is independently H, F, Cl, Br, I,

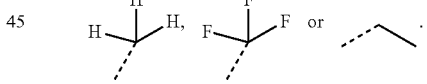

10. The compound or the pharmaceutically acceptable salt thereof according to claim 1, wherein $R_7$ is

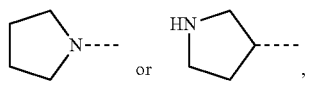

wherein the

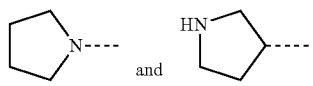

are optionally substituted with 1 or 2 $R_b$.

11. The compound or the pharmaceutically acceptable salt thereof according to claim 10, wherein $R_7$ is

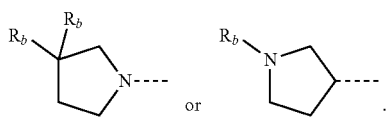

12. The compound or the pharmaceutically acceptable salt thereof according to claim 11, wherein $R_7$ is

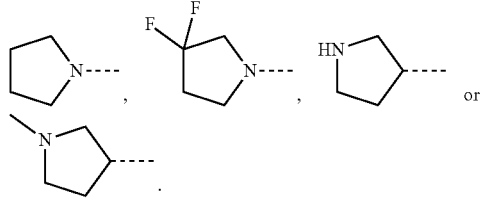

13. The compound or the pharmaceutically acceptable salt thereof according to claim 1, wherein $R_4$ is H or —$CH_3$.

14. The compound or the pharmaceutically acceptable salt thereof according to claim 8, wherein the compound has a structure shown as any one of structural formulas (I-5) to (I-9):

(I-5)
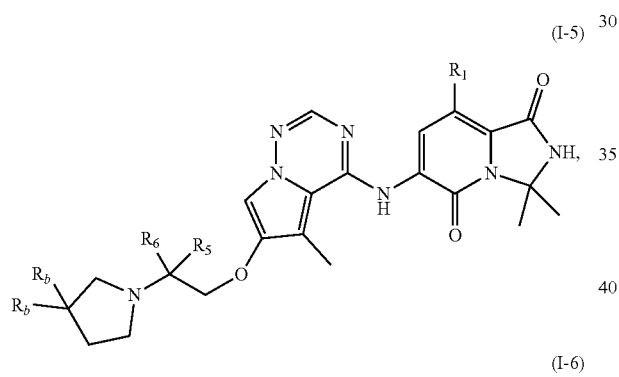

(I-6)
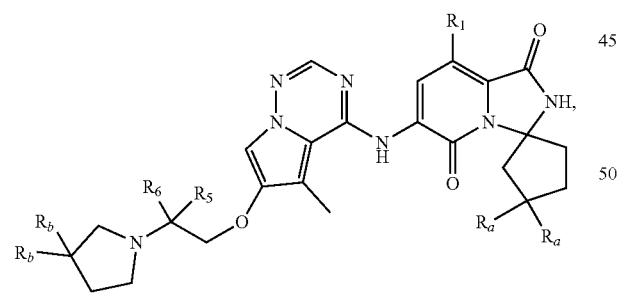

(I-7)
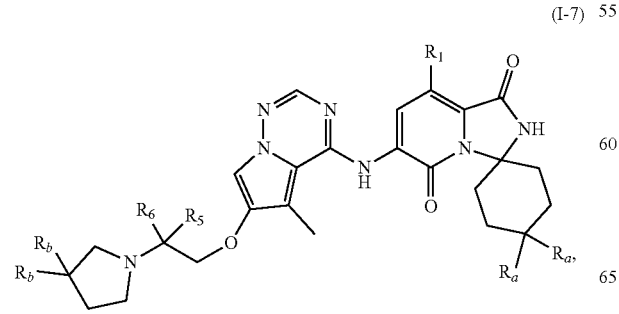

(I-8)
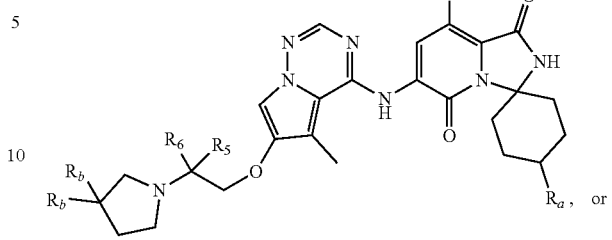

(I-9)
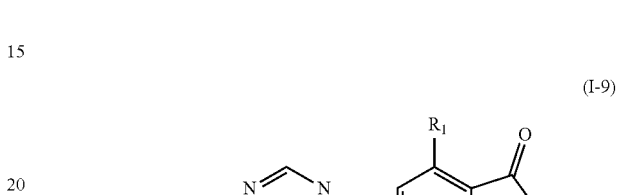

wherein $R_1$, $R_5$, $R_6$, $R_a$ and $R_b$ are as defined in claim 8.

15. The compound or the pharmaceutically acceptable salt thereof according to claim 1, wherein $R_1$ is H, F, Cl or

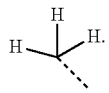

16. The compound or the pharmaceutically acceptable salt thereof according to claim 1, wherein $R_5$ and $R_6$ are each independently H or

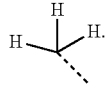

17. A compound of a formula below or a pharmaceutically acceptable salt thereof:

1
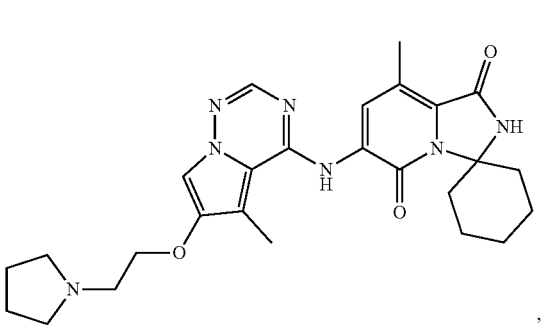

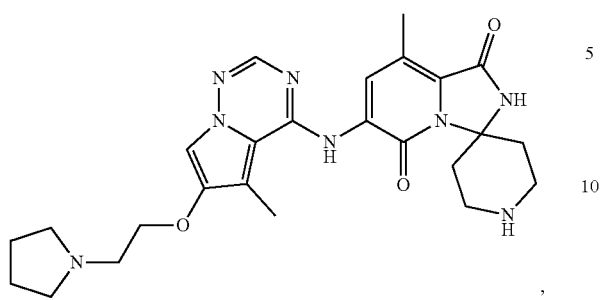
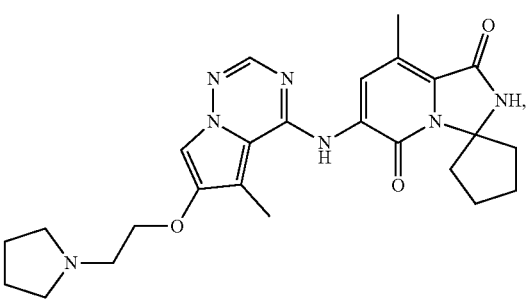

12

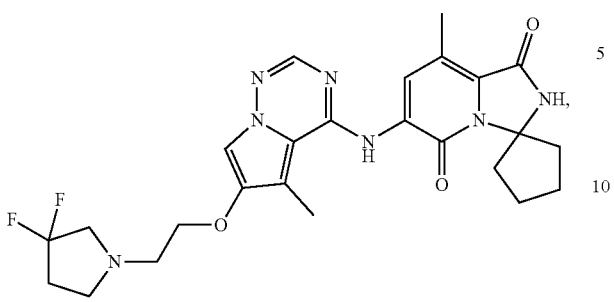

13

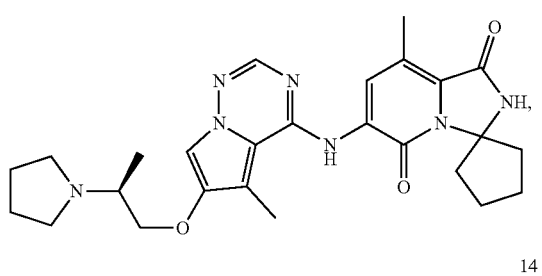

14

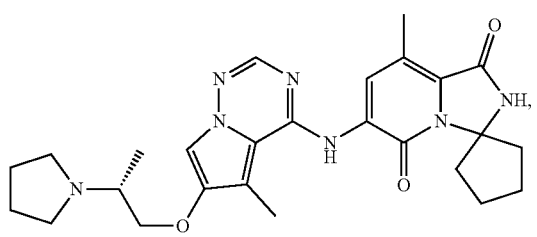

15

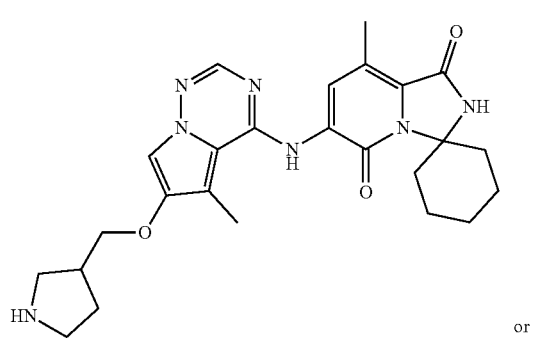

or

16

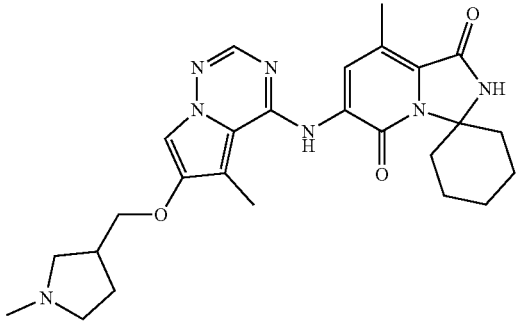

18. The compound or the pharmaceutically acceptable salt thereof according to claim 1, wherein the pharmaceutically acceptable salt is hydrochloride or trifluoroacetate.

19. A method for inhibiting the activity of MNK1/2 in a cell overexpressing MNK1/2 comprising contacting the cell with a compound or a pharmaceutically acceptable salt thereof according to claim 1, wherein the cell overexpressing MNK1/2 is a solid tumor cell selected from a lung cancer cell, a non-small cell lung cancer (NSCLC) cell, a colorectal cancer cell, a colon cancer cell, a rectal cancer cell, a gastric cancer cell, a pancreatic duct carcinoma cell, a colon cancer cell, a thyroid cancer cell, a hairy cell lymphoma cell, Hodgkin's lymphoma cell, non-Hodgkin's lymphoma cell, Burkitt's lymphoma cell, a pancreatic cancer cell, a melanoma cell, a multiple melanoma cell, a brain cancer cell, a CNS cancer cell, a renal cancer cell, a prostate cancer cell, an ovarian cancer cell, a bladder cancer cell, an esophageal cancer cell, a head and neck cancer cell, a breast cancer cell, a glioblastoma cell, a hepatocellular cancer cell, a cervical cancer cell, and a urothelial cancer cell.

20. A method for treating or preventing or MNK1/2 dependent disease in a subject in need thereof comprising administering to the subject a therapeutically effective amount of at least one compound of formula (I) or a pharmaceutically acceptable salt thereof according to claim 1, wherein the MNK1/2 dependent disease is selected from lung cancer, non-small cell lung cancer (NSCLC), colorectal cancer, colon cancer, rectal cancer, gastric cancer, pancreatic duct carcinoma, colon cancer, thyroid cancer, hairy cell lymphoma, Hodgkin's lymphoma, non-Hodgkin's lymphoma, Burkitt's lymphoma, pancreatic cancer, melanoma, multiple melanoma, brain cancer, CNS cancer, renal cancer, prostate cancer, ovarian cancer, bladder cancer, esophageal cancer, head and neck cancer, breast cancer, glioblastoma, myelodysplasia syndrome, malignant glioma, hepatocellular cancer, hepatocellular carcinoma, cervical cancer, and urothelial cancer.

* * * * *